United States Patent
Tamori et al.

(10) Patent No.: US 6,726,997 B2
(45) Date of Patent: Apr. 27, 2004

(54) AQUEOUS DISPERSION AND COATED PRODUCT

(75) Inventors: Kouji Tamori, Tokyo (JP); Hirotaka Shida, Tokyo (JP); Kenji Ishizuki, Tokyo (JP)

(73) Assignee: JSR Corporation, Tokyo (JP)

( * ) Notice: Subject to any disclaimer, the term of this patent is extended or adjusted under 35 U.S.C. 154(b) by 13 days.

(21) Appl. No.: 10/135,427

(22) Filed: May 1, 2002

(65) Prior Publication Data

US 2003/0073779 A1 Apr. 17, 2003

(30) Foreign Application Priority Data

May 8, 2001 (JP) ........................................ 2001-137804

(51) Int. Cl.$^7$ ............................ B32B 9/04; C08G 77/04
(52) U.S. Cl. ..................... 428/447; 428/446; 528/25; 528/32; 528/33; 524/866; 525/479
(58) Field of Search ................................ 524/801, 806, 524/588, 506, 860, 866; 525/100, 479; 528/32, 33, 25; 428/446, 447

(56) References Cited

U.S. PATENT DOCUMENTS 5,973,068 A * 10/1999 Yamaya et al. ............. 524/865
6,147,156 A * 11/2000 Yamaya et al. ............. 524/806

OTHER PUBLICATIONS

Patent Abstracts of Japan, JP 60–135465, Jul. 18, 1985.
Patent Abstracts of Japan, JP 64–001769, Jan. 6, 1989.
Patent Abstracts of Japan, JP 03–045628, Feb. 27, 1991.
Patent Abstracts of Japan, JP 04–214747, Aug. 5, 1992.
Patent Abstracts of Japan, JP 04–261454, Sep. 17, 1992.
Patent Abstracts of Japan, JP 05–025354, Feb. 2, 1993.
Patent Abstracts of Japan, JP 05–331408, Dec. 14, 1993.
Patent Abstracts of Japan, JP 10–120724, May 12, 1998.
Patent Abstracts of Japan, JP 10–183064, Jul. 7, 1998.
Patent Abstracts of Japan, JP 11–255846, Sep. 21, 1999.
Patent Abstracts of Japan, JP 2000–053919, Feb. 22, 2000.
U.S. patent application Ser. No. 09/739,257, filed Dec. 19, 2000, pending.
U.S. patent application Ser. No. 09/958,984, filed Oct. 16, 2001, pending.
U.S. patent application Ser. No. 10/135,427, filed May 1, 2002, pending.

* cited by examiner

*Primary Examiner*—Philip Tucker
*Assistant Examiner*—Michael Feely
(74) *Attorney, Agent, or Firm*—Oblon, Spivak, McClelland, Maier & Neustadt, P.C.

(57) ABSTRACT

An aqueous dispersion which is excellent in storage stability, and can form a coating film excellent in leveling properties, anti-checking properties, water resistance, etc., transparent and high in hardness, which is obtained by mixing and emulsifying (A) at least one selected from an organosilane represented by $(R^1)_{4-n}$—(Si)—$(OR^2)_n$, a hydrolysate of the organosilane and a partial condensation product of the hydrolysate, (B) a radical polymerizable monomer, (C) an emulsifier and (D) a hydrolytic catalyst for component (A) to reduce the particle size of an emulsion, as well as to allow hydrolysis of component (A) to proceed, and adding (E) a radical polymerization initiator to allow polymerization of component (B) to proceed, has a concentration of alcohols having a boiling point of 100° C. or less of 0.1 to 2.0 wt %, and further contains (F) a component having ultraviolet absorption and/or light stabilization action as needed.

15 Claims, No Drawings

AQUEOUS DISPERSION AND COATED PRODUCT

BACKGROUND OF THE INVENTION

The present invention relates to an aqueous dispersion and a coated product. More particularly, the invention relates to an aqueous dispersion of composite polymer particles obtained by a specified condensation/polymerization process of an organosilane and a radical polymerizable monomer, which is low in the concentration of an alcohol or alcohols having a boiling point of 100° C. or less contained therein, contains a component having ultraviolet absorption action and/or light stabilization action as needed, is excellent in leveling properties and anti-checking properties which have never been obtained by conventional methods, and has extremely excellent weather resistance to be useful as a coating; and a coated product coated with a coating containing the aqueous dispersion.

Previously, coating materials have been used in various fields, and the scope of application thereof keeps on expanding. With the expansion of the scope of application, higher-level performances have increasingly been required for the coating materials. In recent years, coating materials have been desired which are excellent in the balance of performances such as adhesion, chemical resistance, moisture resistance, weather resistance, (hot) water resistance and stain resistance, and can form coating films high in hardness.

As coating materials partly satisfying such requirements, there are proposed a composition comprising a partial condensation product of an organosilane, a dispersion of colloidal silica and a silicone-modified acrylic resin (Japanese Patent Laid-open Publication (Sho) 60-135465) and a composition comprising a condensation product of an organosilane, a chelate compound of a zirconium alkoxide and a hydrolytic silyl group-containing vinyl resin (Japanese Patent Laid-open Publication (Sho) 64-1769).

However, all these coating materials are of the solvent type, and the switchover to aqueous coating materials has been promoted, with their use enlarged, because of strong demands for desolvation from the viewpoints of low pollution, resource saving, safety and sanitation in recent years. With the switchover to the aqueous coating materials, higher-level performances have increasingly been required for the aqueous coating materials.

In such a situation, the developments of reactive resin emulsions as the aqueous coating materials which can be expected to improve performances such as water resistance and chemical resistance have intensively been studied, and as one of them, a hydrolytic silyl group-containing resin emulsion has been proposed. As an example thereof, Japanese Patent Laid-open Publication (Hei) 5-25354 discloses a reactive resin emulsion comprising a hydrolytic silyl group- and amineimido group-containing vinyl polymer, and Japanese Patent Laid-open Publication (Hei) 5-331408 discloses an aqueous coating composition comprising an aqueous dispersion of an alkoxysilyl group-containing vinyl polymer and an aqueous dispersion of a tin compound.

However, these hydrolytic silyl group-containing resin emulsions are poor in storage stability, and have a problem in respect to practicability, because particularly when stored for a long period of time, the emulsions gel, or coating films obtained from the emulsions after long-term storage are different from coating films obtained from the emulsions immediately after production in performances, resulting in failure to ensure stable quality. Even when the emulsions are relatively good in storage stability, the balance of performances including adhesion, weather resistance and stain resistance can not be satisfied.

Further, Japanese Patent Laid-open Publication (Hei) 11-255846 proposes a silicone resin-containing emulsion composition obtained by emulsion polymerization of a solution containing a silanol group-containing silicone resin and a radical polymerizable monomer. However, this process precipitates a large amount of condensation product during polymerization, or reduces polymerization ability, so that it is difficult to industrially utilize the process.

On the other hand, of polymer components which have hitherto been used in the coating materials, (meth)acrylic polymers have been widely used in the coating materials as aqueous dispersions, because of their excellent transparency and film forming properties. Further, polysiloxanes have excellent weather resistance, water repellency and adhesion to inorganic base materials. Aiming at the synergetic effect of excellent performances of these (meth)acrylic polymers and polysiloxanes, for example, Japanese Patent Laid-open Publication (Hei) 3-45628 and Japanese Patent Laid-open Publication (Hei) 4-261454 propose that both the polymer components are compounded, and used in coating materials. However, although the composite materials of these (meth) acrylic polymers and polysiloxanes have good weather resistance, they can not be satisfied in terms of adhesion to organic base materials and weather resistance to stripe-like stains caused by rain fall. Further, Japanese Patent Laid-open Publication (Hei) 4-214747 proposes a self-crosslinking polymer latex composition comprising an organopolysiloxane-containing polymer latex obtained by copolymerizing a carbonyl group-containing monomer with another monomer in the presence of hydrolytic silane, and a multifunctional hydrazine derivative. Still further, Japanese Patent Laid-open Publication 2000-53919 proposes a silicone-containing aqueous coating agent composition obtained by polymerizing an aqueous emulsion containing a polyalkoxypolysiloxane, an unsaturated monomer and an emulsifier. However, these compositions are also difficult to retain the weather resistance and stain resistance of coating films for a long period of time.

Furthermore, Japanese Patent Laid-open Publication (Hei) 9-3394 proposes a composition for a coating which can retain luster retaining properties and weather resistance for a long period of time, the composition containing a copolymer obtained by polymerization, for example, emulsion polymerization, of a monomer mixture containing a benzotriazole-based ultraviolet absorbing monomer, a cycloalkyl group-containing unsaturated monomer and a hydroxyl group-containing monomer. In addition, Japanese Patent Laid-open Publication (Hei) 10-120724 proposes a highly durable emulsion which is an acrylic emulsion obtained by emulsion polymerization of an acrylic monomer in an aqueous medium in the presence of an ultraviolet absorbing agent and/or a light stabilizer, and by silicone modification during or after the emulsion polymerization.

However, of these, the former can not be satisfied as a coating in various characteristics, because the polymer contained therein has no polysiloxane component. The latter has a limitation on the amount of the polysiloxane component substantially compounded/integrated, from the restrictions of polymerization stability and storage stability. Further, the silicone modification is carried out after the emulsion polymerization of the acrylic monomer has substantially considerably proceeded. Accordingly, the polysiloxane component and the acrylic monomer are not sufficiently compounded/integrated, which causes a problem in storage stability.

Furthermore, the latter is not necessarily sufficient as a coating in various characteristics.

As described above, the aqueous coating agents have previously been used in various fields against a background of the environmental problems, and the scope of application thereof keeps on expanding. With the expansion of the scope of application, higher-level performances have increasingly been required for the coating agents.

In particular, coating agents have recently been desired which have such a high level of weather resistance that recoating is unnecessary for 10 to 30 years when they are used as coatings for outer walls.

As means for satisfying these requirements, the polyorganosiloxane composite polymer particles disclosed in Japanese Patent Laid-open Publication (Hei) 3-45628, which are obtained by compounding a polyorganosiloxane and an organic polymer component, have come to be widely used.

In particular, an aqueous dispersion disclosed in Japanese Patent Laid-open Publication 2001-302920 is a coating agent having a high level of weather resistance. However, when it is tried to increase a polyorganosiloxane component in polyorganosiloxane composite polymer particles, using an alkoxysilane as a raw material in order to improve weather resistance, an alcohol is produced by hydrolysis of the raw material alkoxysilane. The volatility of this alcohol causes fine cracks to be developed in surfaces of coating films in forming the coating films. That is to say, the aqueous dispersion described above has the problem of poor anti-checking properties.

Further, as a method for compounding a relatively large amount of polyorganosiloxane and reducing the concentration of alcohol contained, there is, for example, a method disclosed in Japanese Patent Laid-open Publication 10-183064, in which a silanol group-containing silicone resin is previously synthesized, and dissolved in a radical polymerizable monomer after the removal of a solvent, followed by emulsion polymerization. However, according to this method, the activity of the silanol group contained in the silicone resin is low, and coating films after film formation have no weather resistance to be expected. Further, an utterly alcohol-free aqueous dispersion polymerized by this method is poor in leveling properties.

SUMMARY OF THE INVENITON

An object of the present invention is to provide an aqueous dispersion comprising a composite material of a vinyl polymer and a polyorganosiloxane, which is excellent in storage stability, and can form a coating film excellent in leveling properties and anti-checking properties which have never been obtained by conventional methods, having extremely excellent adhesion, water resistance, organic chemical resistance, stain resistance, weather resistance and frost resistance, and moreover transparent and high in hardness.

Another object of the invention is to provide a coated product coated with a coating containing the above-mentioned aqueous dispersion.

According to the invention, first, there is provided an aqueous dispersion obtained by mixing and emulsifying (A) at least one component selected from the group consisting of an organosilane represented by the following general formula (1), a hydrolysate of the organosilane and a partial condensation product of the hydrolysate, (B) a radical polymerizable monomer, (C) an emulsifier and (D) a hydrolytic catalyst for component (A) to reduce the particle size of an emulsion, as well as to allow hydrolysis of component (A) to proceed, and then adding (E) a radical polymerization initiator to allow polymerization of component (B) to proceed, which has a concentration of an alcohol or alcohols having a boiling point of 100° C. or less of 0.1% to 2.0% by weight and further contains (F) a component having ultraviolet absorption action and/or light stabilization action as needed:

$$(R^1)_{4-n}-(Si)-(OR^2)_n \tag{1}$$

wherein $R^1$ indicates a monovalent organic group having 1 to 8 carbon atoms, wherein when two $R^1$'s exist, they may be the same or different; $R^2$ indicates a straight-chain or branched alkyl group having 1 to 5 carbon atoms or an acyl group having 1 to 6 carbon atoms, wherein when two $R^2$'s exists, they may be the same or different; and n is an integer of from 2 to 4.

Secondly, the invention provides the above-mentioned aqueous dispersion obtained by mixing and emulsifying the above-mentioned component (A), (B) a radical polymerizable monomer, (C) an emulsifier, (D) a hydrolytic catalyst for component (A) and (F) a component having ultraviolet absorption action and/or light stabilization action as needed to reduce the particle size of an emulsion, as well as to allow hydrolysis of component (A) to proceed, adding (E) a radical polymerization initiator to allow polymerization of component (B) to proceed, and then removing an alcohol or alcohols having a boiling point of 100° C. or less by distillation.

Thirdly, according to the invention, there is provided a coated product in which a coating containing the above-mentioned aqueous dispersion is applied to a base material.

DESCRIPTION OF THE PREFERRED EMBODIMENTS

The aqueous dispersion of the invention comprises the composite polymer particles in which the polyorganosiloxane is compounded at a relatively high concentration, and silanol groups rich in activity are contained in the particles. Accordingly, it has extremely high weather resistance. Moreover, the restriction of the alcohol concentration to the specified range provides leveling properties and anti-checking properties which have never been attained by conventional methods.

Further, the method for producing the aqueous dispersion comprising subjecting the radical polymerizable monomer to mini-emulsion polymerization in an aqueous medium in the presence of the hydrolysate/condensation product of the organosilane and the emulsifier has the following advantages which have never been obtained by conventional methods:

(I) The excess hydrolysis reaction of the organosiloxane does not proceed during the radical polymerization of the radical polymerizable monomer, so that changes in the concentration of an alcohol or alcohols, a by-product or by-products of the hydrolysis reaction during the radical polymerization, are small. Accordingly, even when a relatively large amount of polyorganosiloxane is contained, reaction stability during the radical polymerization is good.

(II) The radical polymerizable monomer is polymerized in an emulsion particle in the presence of component (A), the siloxane component, so that a structure in which the siloxane component is extremely finely dispersed in the composite polymer is formed, or the siloxane component and the composite polymer form an inter-penetrating polymer network (IPN) structure.

As a result, even when a methyl silicone resin poor in mutual solubility is used as the siloxane component, a coating film excellent in transparency is formed, and deficiencies in characteristics of both resins are also complemented. In particular, a silicone resin rich in hardness, chemical resistance and weather resistance can be used in large amounts, so that a coating layer formed is excellent in film forming properties, good in characteristics such as scratch resistance, weather resistance and chemical resistance, and a uniform hardened coating layer good in flexibility is provided.

(III) The polymers coexist in a solventless state in an emulsion particle, so that the degree of freedom of a condensation activity-rich silanol group contained in the siloxane component is limited.

As a result, the condensation of the silanol group is inhibited to give good storage stability.

(IV) A silanol group having a specific structure is contained in a definite amount or more in the siloxane component (silicone resin), so that the silanol group is restrained in a good state in an emulsion particle, whereas its high hardening activity is retained to ensure excellent hardenability even at relatively low temperatures. Further, the straight-chain structure is increased by allowing the silanol group having a specific structure such as a dialkoxysilane to be contained in large amounts as the hydrolytic silane compound, and the conflicting characteristics of flexibility and hardness can be imparted to a coating layer at the same time.

(V) The alkoxysilane is hydrolyzed/condensed in the radical polymerizable monomer, followed by proceeding to a mini-emulsion polymerization stage, so that activity of the silanol group is high, compared with the case that a silanol group-containing condensation product obtained from previously hydrolyzed alkoxysilane by isolation is used by dissolving it, and interparticle crosslinking proceeds after drying and film formation to exhibit a high level of weather resistance.

Further, we have discovered that the method of adjusting the alcohol concentration in the system to the specified range is particularly effective, in order to improve leveling properties and anti-checking properties in the aqueous dispersion of the invention.

The invention will be described in detail below.

Component (A)

Component (A) used in the invention is at least one component selected from the group consisting of the organosilane represented by the above-mentioned general formula (1) (hereinafter referred to as "organosilane (1)", the hydrolysate of organosilane (1) and the partial condensation product of the hydrolysate.

In general formula (1), the monovalent organic groups of $R^1$ having 1 to 8 carbon atoms include, for example, an epoxy group, a glycidyl group, a (meth)acryloyloxy group, a ureido group, an amido group, a fluoroacetoamido group and an isocyanato group, as well as a phenyl group; a straight-chain, branched or cyclic alkyl group such as methyl, ethyl, n-propyl, i-propyl, n-butyl, i-butyl, sec-butyl, t-butyl, n-hexyl, n-heptyl, n-octyl, 2-ethylhexyl, cyclopentyl or cyclohexyl; an acyl group such as acetyl, propionyl, butyryl, valeryl, benzoyl, toluoyl or caproyl; an alkenyl group such as vinyl or allyl; and substituent derivatives thereof.

The substituent groups in the substituent derivatives of $R^1$ include, for example, a halogen atom, a substituted or unsubstituted amino group, a hydroxyl group, a mercapto group, an isocyanate group, a glycidoxy group, a 3,4-epoxycyclohexyl group, a (meth) acryloyloxy group, a ureido group and an ammonium salt group. The total number of carbon atoms in each of these substituent derivatives of $R^1$ is 8 or less including the carbon atoms in the substituent group.

The alkyl groups of $R^2$ having 1 to 5 carbon atoms include, for example, methyl, ethyl, n-propyl, i-propyl, n-butyl, sec-butyl, t-butyl and n-pentyl. The acyl groups having 1 to 6 carbon atoms include, for example, acetyl, propionyl, butyryl, valeryl and caproyl.

Specific examples of organosilanes (1) include methyltriacetyloxysilane and dimethyldiacetyloxysilane, as well as tetraalkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocianatopropyltrimethoxysilane, 3-isocianatopropyltriethoxysilane, 3-glycidoxypropyltrimethoxysilane, 3-glycidoxypropyltriethoxysilane, 2-(3,4-epoxycyclohexyl)-ethyltrimethoxysilane, 2-(3,4-epoxycyclohexyl)ethyltriethoxysilane, 3-(meth)acryloyloxypropyltrimethoxysilane, 3-(meth)acryloyloxypropyltriethoxysilane, 3-ureidopropyltrimethoxysilane and 3-ureidopropyltriethoxysilane; and dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane, 3-glycidoxypropyldimethoxymethylsilane and 3-glycidoxypropyldiethoxymethylsilane.

Of these organosilanes (1), preferably used are trialkoxysilanes and dialkoxysilanes. As the trialkoxysilanes, preferred are methyltrimethoxysilane and methyltriethoxysilane. Further, as the dialkoxysilane, preferred are dimethyldimethoxysilane and dimethyldiethoxysilane.

The above-mentioned organosilanes (1) can be used either alone or as a mixture of two or more of them.

Although the hydrolyzate of organosilane (1) in component (A) is one in which Si—$OR^2$ groups contained in organosilane (1) are hydrolyzed to form silanol (Si—OH) groups, it is unnecessary that all of these groups are hydrolyzed in the invention. For example, it may be one in which only one is hydrolyzed, one in which two or more are hydrolyzed, or a mixture thereof.

Further, the partial condensation product of the hydrolysate of organosilane (1) in component (A) (hereinafter briefly referred to as "partial condensation product") is one in which silanol groups contained in the hydrolyzate are condensed to form siloxane (Si—O—Si) bonds. In the present invention, however, it is unnecessary that these groups are all condensed, and the partial condensation product is a concept including one in which a part of the silanol groups have been condensed and a mixture of condensation products whose levels of condensation are different.

In the invention, it is preferred that organosilane (1) and the partial condensation product are used for component (A) as a mixture. Thus, co-condensation of organosilane (1) and the partial condensation product can form a coating film excellent in various characteristics from the final aqueous dispersion. Further, when component (E) described later is added to polymerize the radical polymerizable monomer, polymerization stability is improved, and polymerization can be easily conducted even in a high solid content state. Accordingly, there is also the advantage that it becomes favorable in respect to industrialization.

When organosilane (1) and the partial condensation product are used together, a dialkoxysilane is preferably used as organosilane (1). It is particularly preferred that dimethyldimethoxysilane or dimethyldiethoxysilane is used. The use of the dialkoxysilane adds a straight-chain moiety to an organopolysiloxane molecular chain, which causes an increase in flexibility of composite polymer particles obtained. Further, when a coating film is formed by use of the resulting aqueous dispersion, the effect of obtaining a coating film excellent in transparency is achieved.

Further, when organosilane (1) and the partial condensation product are used together, it is particularly preferred that organosilane (1) is only a trialkoxysilane or a combination of 40 to 95 mol % of a trialkoxysilane and 60 to 5 mol % of a dialkoxysilane. The use of the dialkoxysilane and the trialkoxysilane at this rate can soften the resulting coating film and can improve alkali resistance.

When organosilane (1) and the partial condensation product are used together, it is preferred that organosilane (1) is previously hydrolyzed/condensed to prepare the partial condensation product of organosilane (1). In preparing the partial condensation product, organosilane (1) is preferably hydrolyzed/condensed by adding a proper amount of water, and further an organic solvent as needed, to organosilane (1).

The amount of water used in this case is usually from about 1.2 to about 3.0 moles, and preferably from about 1.3 to 2.0 moles, per mole of organosilane (1).

There is no particular limitation on the organic solvent used as needed, as long as it is uniformly miscible with the resulting partial condensation product and component (B) described later. The organic solvents include, for example, alcohols, aromatic hydrocarbons, ethers, ketones and esters.

Of these organic solvents, specific examples of the alcohols include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol mono-n-butyl ether, ethylene glycol monoethyl ether acetate, diethylene glycol monoethyl ether, propylene glycol monomethyl ether, propylene monomethyl ether acetate and diacetone alcohol.

Specific examples of the aromatic hydrocarbons include benzene, toluene and xylene, specific examples of the ethers include tetrahydrofuran and dioxane, specific examples of the ketones include acetone, methyl ethyl ketone, methyl isobutyl ketone and diisobutyl ketone, and specific examples of the esters include ethyl acetate, n-propyl acetate, n-butyl acetate and propylene carbonate.

These organic solvents can be used alone or as a mixture of two or more of them.

When the organic solvent is contained in the partial condensation product, the organic solvent can also be removed prior to condensation/polymerization reaction described later.

The polystyrene-converted weight-average molecular weight (hereinafter referred to as "Mw") of the partial condensation product is preferably from 800 to 100,000, and more preferably from 1,000 to 50,000.

The partial condensation product is commercially available as MKC silicate manufactured by Mitsubishi Chemical Corporation, ethyl silicate manufactured by Colcoat Co., a silicon resin manufactured by Dow Corning Toray Silicone Co., Ltd., a silicon resin manufactured by Toshiba Silicones Co., a silicon resin manufactured by SHIN-ETSU CHEMICAL CO., LTD., hydroxyl group-containing polydimethylsiloxane manufactured by Dow Corning, Asia and a silicon oligomer manufactured by Nippon Unicar Company Limited, and these may be used as such, or after further condensation thereof.

When organosilane (1) and the partial condensation product are used together as component (A), for the mixing ratio of both, the amount of organosilane (1) (converted to a completely hydrolyzed condensation product) is from 95% to 5% by weight, and preferably from 90% to 10% by weight, and the amount of the partial condensation product (converted to a completely hydrolyzed condensation product) is from 5% to 95% by weight, and preferably from 10% to 90% by weight (with the proviso that the total of organosilane (1) and the partial condensation product is 100% by weight). Less than 5% by weight of the partial condensation product is unfavorable, because there is a fear of development of tackiness on a surface of a coating film obtained, or deterioration of the hardenability of the coating film. On the other hand, exceeding 95% by weight results in too low a ratio of organosilane (1), which is liable to makes it difficult to emulsify a mixture containing component (A). Further, there is a fear of lowering the polymerization stability of component (B) or the stability of an emulsion in polymerization, or of deteriorating the film forming properties of the resulting aqueous dispersion.

The above-mentioned "completely hydrolyzed condensation product" as used herein means a condensation product in which 100% of Si—$OR^2$ groups contained in organosilane (1) are hydrolyzed to silanol groups, which are further completely condensed to form siloxane bonds.

Radical Polymerizable Monomer (B)

There is no particular limitation on the radical polymerizable monomer used in the invention, as long as it is radically polymerizable.

The radical polymerizable monomers include, for example, radical polymerizable monomers contained in component (F) described later, as well as (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth) acrylate, t-butyl (meth)acrylate, n-amyl (meth)acrylate, i-amyl (meth)acrylate, n-hexyl (meth)acrylate, n-octyl (meth)acrylate, 2-ethylhexyl (meth)acrylate, n-decyl (meth) acrylate, n-dodecyl (meth)acrylate, cyclohexyl (meth) acrylate, p-t-butylcyclohexyl (meth)acrylate, phenyl (meth) acrylate and benzyl (meth)acrylate; hydroxyl group-containing (meth)acrylates such as 2-hydroxyethyl (meth) acrylate, 2-hydroxypropyl (meth)-acrylate, 3-hydroxypropyl (meth)acrylate, polyethylene glycol mono(meth)acrylate, polypropylene glycol mono(meth)acrylate, a mono(meth) acrylate of an ethylene oxide/propylene oxide random copolymer, a mono(meth)acrylate of an ethylene oxide/ propylene oxide block copolymer, glycerol mono(meth) acrylate and glycerol di(meth)acrylate; amino group-containing (meth)acrylates such as 2-aminoethyl (meth) acrylate, 2-dimethylaminoethyl (meth)acrylate, 2-aminopropyl (meth)acrylate, 2-dimethylaminopropyl (meth)acrylate, 3-aminopropyl (meth)acrylate and 3-dimethylaminopropyl (meth)acrylate; epoxy group-containing (meth)acrylates such as glycidyl (meth)acrylate and 2-(3,4-epoxycyclohexyl)ethyl (meth)acrylate; fluorine-containing (meth)acrylates such as trifluoroethyl (meth) acrylate and pentadecafluoro-n-octyl (meth)acrylate; multi-functional (meth)acrylates such as ethylene glycol di(meth) acrylate, diethylene glycol di(meth)acrylate, triethylene glycol di(meth)acrylate, tetraethylene glycol di(meth) acrylate, propylene glycol di(meth)acrylate, dipropylene glycol di(meth)acrylate, tripropylene glycol di(meth) acrylate, tetrapropylene glycol di(meth)acrylate, 1,4-butanediol di(meth)acrylate, 1,6-hexanediol di(meth) acrylate, glycerol tri(meth)acrylate, trimethylolpropane tri (meth)acrylate, pentaerythritol tetra(meth)acrylate, polyethylene glycol di(meth)acrylate, polypropylene glycol di(meth)acrylate, a di(meth)acrylate of an ethylene oxide/ propylene oxide random copolymer and a di(meth)acrylate of an ethylene oxide/propylene oxide block copolymer; unsaturated carboxylic acids such as (meth)acrylic acid, crotonic acid, maleic acid, fumaric acid and itaconic acid; unsaturated carboxylic acid anhydrides such as maleic anhydride and itaconic anhydride; aromatic vinyl compounds such as styrene, α-methylstyrene, 2-methylstyrene, 3-methylstyrene, 4-methylstyrene, 3,4-dimethylstyrene, 4-ethylstyrene, 3,4-diethylstyrene, 4-t-butylstyrene, 4-methoxystyrene, 4-ethoxystyrene, 4-hydroxymethyl-styrene, 2-chlorostyrene, 3-chlorostyrene, 4-chloro-3-methylstyrene, 2,4-dichlorostyrene, 2,6-dichlorostyrene, 1-vinylnaphthalene and divinylbenzene; unsaturated amide compounds such as (meth)acrylamide, N-methyl(meth) acrylamide, N,N-dimethyl(meth)acrylamide, N-methylol (meth)acrylamide, N-methoxymethyl(meth)acrylamide, N-n-butoxymethyl(meth)acrylamide, N,N'-methylene-bisacrylamide and maleic acid amide; unsaturated imide compounds such as maleimide, N-cyclohexylmaleimide and N-phenylmaleimide; vinyl cyanide compounds such as (meth)acrylonitrile and α-chloroacrylonitrile; amineimido group-containing vinyl compounds such as 1,1,1-trimethylamine(meth)acrylimide, 1-methyl-1-ethylamine (meth)acrylimide, 1,1-dimethyl-1-(2-hydroxypropyl)amine (meth)acrylimide, 1,1-dimethyl-1-(2-phenyl-2-hydroxyethyl)amine(meth)acrylimide and 1,1-di-methyl-1-(2-hydroxy-2-phenoxypropyl)amine(meth)acrylimide; unsaturated ether compounds such as ethyl vinyl ether, 2-hydroxyethyl vinyl ether, 2-aminoethyl vinyl ether and allyl glycidyl ether; aldo group-containing unsaturated compounds such as (meth)acrolein, crotonaldehyde, formylstyrene, formyl-α-methylstyrene, (meth) acrylamidopivalic aldehyde, 3-(meth)acrylamidomethyl-anisaldehyde and a β-(meth)acryloxy-α,α-dialkylpropanal represented by the following general formula (2):

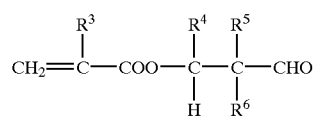

wherein $R^3$ represents a hydrogen atom or a methyl group, $R^4$ represents a hydrogen atom or an alkyl group having 1 to 3 carbon atoms, $R^5$ represents an alkyl group having 1 to 3 carbon atoms, and $R^6$ represents an alkyl group having 1 to 4 carbon atoms; keto group-containing unsaturated compounds such as diacetone(meth)acrylamide, a vinylalkyl ketone having 4 to 7 carbon atoms (for example, vinylmethyl ketone, vinylethyl ketone, vinyl-n-propyl ketone, vinyl-i-propyl ketone, vinyl-n-butyl ketone, vinyl-i-butyl ketone or vinyl-t-butyl ketone), vinylphenyl ketone, vinylbenzyl ketone, divinyl ketone, diacetone (meth)acrylate, acetonitrile (meth)acrylate, 2-hydroxypropyl (meth) acrylate-acetylacetate, 3-hydroxy-propyl(meth)acrylate-acetylacetate, 2-hydroxybutyl(meth)acrylate-acetylacetate, 3-hydroxybutyl(meth)acrylate-acetylacetate, 4-hydroxybutyl(meth)acrylate-acetylacetate and butanediol-1,4 (meth)acrylate-acetylacetate; and radical polymerizable monomers having groups which can form siloxane bonds such as $CH_2=CHSi(CH_3)(OCH_3)_2$, $CH_2=CHSi(OCH_3)_3$, $CH_2=CHSi(CH_3)Cl_2$, $CH_2=CHSiCl_3$, $CH_2=CHCOO(CH_2)_2Si(CH_3)(OCH_3)_2$, $CH_2=CHCOO(CH_2)_2Si(OCH_3)_3$, $CH_2=CHCOO(CH_2)_3Si(CH_3)(OCH_3)_2$, $CH_2=CHCOO(CH_2)_3Si(OCH_3)_3$, $CH_2=CHCOO(CH_2)_2Si(CH_3)Cl_2$, $CH_2=CHCOO(CH_2)_2SiCl_3$, $CH_2=CHCOO(CH_2)_3Si(CH_3)Cl_2$, $CH_2=CHCOO(CH_2)_3SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)Cl_2$, $CH_2=C(CH_3)COO(CH_2)_2SiCl_3$, $CH_2=C(CH_3)COO(CH_2)_3Si(CH_3)Cl_2$, and $CH_2=C(CH_3)COO(CH_2)_3SiCl_3$.

Specific examples of the above-mentioned β-(meth) acryloxy-α,α-dialkylpropanals include β-(meth)acryloxy-α, α-dimethylpropanal (that is to say, β-(meth)acryloxy-pivalic aldehyde), β-(meth)acryloxy-α,α-diethylpropanal, β-(meth) acryloxy-α,α-dipropylpropanal, β-(meth)acryloxy-α-methyl-α-butylpropanal and β-(meth)acryloxy-α,α,β-trimethylpropanal.

The radical polymerizable monomers used in the invention are preferably (meth)acrylic compounds, more preferably (meth)acrylates, hydroxyl group-containing (meth) acrylates, (meth)acrylic acid, unsaturated amides and keto group-containing unsaturated compounds, and particularly preferably methyl methacrylate, n-butyl (meth)acrylate, t-butyl (meth)acrylate, 2-ethylhexyl (meth)acrylate, cyclohexyl (meth)acrylate, 2-hydroxyethyl (meth)acrylate, polyethylene glycol mono(meth)acrylate, glycidyl (meth) acrylate, (meth)acrylic acid, (meth)acrylamide, N,N-dimethyl (meth)acrylamide, N-methylol(meth)acrylamide and diacetone(meth)acrylamide.

Examples of the radical polymerizable monomers having ultraviolet absorption action and/or light stabilization action preferably used in the invention will be described later.

For the ratio of component (A) to component (B) used in the aqueous dispersion of the invention, the total amount of component (A)(converted to a completely hydrolyzed condensation product) is from 1 to 99 parts by weight, and preferably from 5 to 95 parts by weight, and the amount of component (B) is from 99 to 1 part by weight, and preferably from 95 to 5 parts by weight (with the proviso that (A)+

(B)=100 parts by weight). Less than 1 part by weight of component (B) is unfavorable, because film forming properties and crack resistance are liable to be deteriorated. On the other hand, exceeding 99 parts by weight is unfavorable, because weather resistance is liable to be deteriorated.

Emulsifier (C)

As the emulsifiers used in the invention, there can be used, for example, any of anionic surfactants, nonionic surfactants, cationic surfactants, amphoteric surfactants and water-soluble polymers.

The above-mentioned anionic surfactants include, for example, reactive anionic surfactants such as LATEMUL S-180A (manufactured by KAO CORPORATION), Eleminol JS-2 (manufactured by SANYO CHEMICAL INDUSTRIES, LTD.), Aqualon KH-10 (manufactured by Dai-ichi Kogyo Seiyaku Co., Ltd.) and ADEKA REASOAP SE-10N (manufactured by Asahi Denka Kogyo K.K.), Antox MS-60 (manufactured by Nippon Nyukazai Co., Ltd.) and Surfmer FP-120 (manufactured by Toho Chemical Industry Co., Ltd.) in trade names, as well as alkali metal salts of higher alcohol sulfate esters, alkali metal salts of alkylbenzenesulfonic acids, alkali metal salts of succinic acid dialkyl ester sulfonic acids, alkali metal salts of alkyl diphenyl ether disulfonic acids, sulfate ester salts of polyoxyethylene alkyl ethers, sulfate ester salts of polyoxyethylene alkyl phenyl ethers, phosphoric ester salts of polyoxyethylene alkyl ethers and phosphoric ester salts of polyoxyethylene alkyl phenyl ethers.

The above-mentioned nonionic surfactants include, for example, reactive nonionic surfactants such as Aqualon RN-20 (manufactured by Dai-ichi Kogyo Seiyaku Co., Ltd.) and ADEKA REASOAP NE-20 (manufactured by Asahi Denka Kogyo K.K.) in trade names, as well as polyoxyethylene alkyl ethers and polyoxyethylene alkyl phenyl ethers.

The above-mentioned cationic surfactants include, for example, reactive cationic surfactants such as diallylammonium halide compounds as described in Japanese Patent Laid-open Publication (Sho) 60-235631, as well as alkylpyridinyl chlorides, alkylamine acetates and alkylammonium chlorides.

The above-mentioned amphoteric surfactants are suitably, for example, carboxylic acid type amphoteric surfactants such as amino acid type and betaine type amphoteric surfactants, and sulfonic acid type amphoteric surfactants. Further, as the above-mentioned water-soluble polymers, there can be used, for example, known alkali-soluble polymers.

These surfactants can be used either alone or as a mixture of two or more of them.

The amount of the emulsifier used is usually from 0.1 to 10 parts by weight, and preferably from 0.2 to 5 parts by weight, based on 100 parts by weight of the total amount of component (A)(converted to a completely hydrolyzed condensation product) and component (B). When the amount of the emulsifier used is less than 0.1 part by weight, it is likely to become difficult to sufficiently emulsify reaction components, or the emulsion stability in hydrolysis/condensation and radical polymerization tends to deteriorate. On the other hand, exceeding 10 parts by weight results in the possibility of increased foaming to cause workability to deteriorate.

Hydrolytic Catalyst (D)

In the invention, the use of the hydrolytic catalyst for component (A)(hereinafter briefly referred to as the "hydrolytic catalyst") allows hydrolysis of component (A) to proceed before radical polymerization, and moreover increases the molecular weight of an organopolysiloxane resin produced by polycondensation reaction of component (A). Consequently, the coating film excellent in physical strength and in long-term durability can be obtained, and an increase in thickness of the coating film and the coating operation also become easy.

The hydrolytic catalysts include, for example, acidic compounds, alkaline compounds, salt compounds, amine compounds, organometallic compounds and/or their partial hydrolyzates (the organometallic compounds and/or their partial hydrolyzates are hereinafter collectively referred to as "organometallic compounds, etc.").

The above-mentioned acidic compounds include, for example, acetic acid, hydrochloric acid, sulfuric acid, phosphoric acid, an alkyltitanic acid, dodecylbenzenesulfonic acid, p-toluenesulphonic acid, phthalic acid and (meth)acrylic acid which is also component (B). Of these acidic compounds, preferred are acetic acid, dodecylbenzenesulfonic acid and (meth)acrylic acid.

When a radical polymerizable unsaturated carboxylic acid such as (meth)acrylic acid is used as the hydrochloric acid, it is polymerized as component (B), which brings the advantage that the weather resistance and water resistance of the resulting coating film are not deteriorated is obtained. In such a case, the content of the radical polymerizable unsaturated carboxylic acid in component (B) is usually 5% by weight or less, and preferably from about 0.1% to about 3% by weight.

Further, the above-mentioned alkaline compounds include, for example, sodium hydroxide and potassium hydroxide. Of these alkaline compounds, preferred is sodium hydroxide.

Still further, the above-mentioned salt compounds include, for example, alkali metal salts of naphthenic acid, octylic acid, nitrous acid, sulfurous acid, aluminic acid and carbonic acid.

Furthermore, the above-mentioned amine compounds include, for example, various modified amines used as hardeners for epoxy resins, as well as ethylenediamine, tetramethylenediamine, hexamethylenediamine, diethylenetriamine, triethylenetetramine, tetraethylenepentamine, piperidine, piperadine, m-phenylenediamine, p-phenylenediamine, ethanolamine, triethylamine, γ-aminopropyltrimethoxysilane, γ-aminopropyltriethoxysilane, γ-(2-aminoethyl)-aminopropyltrimethoxysilane, γ-(2-aminoethyl)-aminopropyltriethoxysilane, γ-(2-aminoethyl)-aminopropylmethyldimethoxysilane, γ-anilinopropyltrimethoxysilane, alkylamine salts and quaternary ammonium salts. Of these amine compounds, preferred are γ-aminopropyltrimethoxysilane, γ-aminopropyltriethoxysilane and γ-(2-aminoethyl)-aminopropyltrimethoxysilane.

The above-mentioned organometallic compounds, etc. include, for example, carboxylic acid type organotin compounds such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $(C_8H_{17})_2Sn(OCOCH=CHCOOC_{16}H_{33})_2$, $(C_8H_{17})_2Sn(OCOCH=CHCOOC_{17}H_{35})_2$, $(C_8H_{17})_2Sn(OCOCH=CHCOOC_{18}H_{37})_2$, $(C_8H_{17})_2Sn(OCOCH=CHCOOC_{20}H_{41})_2$,

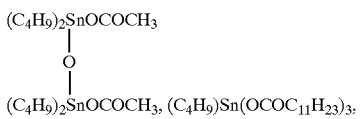

and (C$_4$H$_9$) Sn(OCONa)$_3$; mercaptide type organotin compounds such as (C$_4$H$_9$)$_2$Sn(SCH$_2$COOC$_8$H$_{17}$)$_2$, (C$_4$H$_9$)$_2$Sn(SCH$_2$CH$_2$COOC$_8$H$_{17}$)$_2$, (C$_8$H$_{17}$)$_2$Sn(SCH$_2$COOC$_8$H$_{17}$)$_2$, (C$_8$H$_{17}$)$_2$Sn(SCH$_2$CH$_2$COOC$_8$H$_{17}$)$_2$, (C$_8$H$_{17}$)$_2$Sn(SCH$_2$COOC$_{12}$H$_{25}$)$_2$, (C$_8$H$_{17}$)$_2$Sn(SCH$_2$CH$_2$COOC$_{12}$H$_{25}$)$_2$, (C$_4$H$_9$)Sn(SCOCH=CHCOOC$_8$H$_{17}$)$_3$, (C$_8$H$_{17}$)Sn(SCOCH=CHCOOC$_8$H$_{17}$)$_3$, and

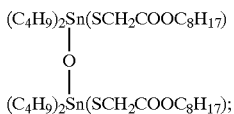

sulfide type organotin compounds such as (C$_4$H$_9$)$_2$Sn=S, (C$_8$H$_{17}$)$_2$Sn=S, and

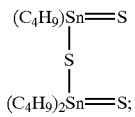

chloride type organotin compounds such as (C$_4$H$_9$)SnCl$_3$, (C$_4$H$_9$)$_2$SnCl$_2$, (C$_8$H$_{17}$)$_2$SnCl$_2$, and

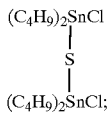

organotin oxides such as (C$_4$H$_9$)$_2$SnO and (C$_8$H$_{17}$)$_2$SnO; and reaction products of these organic tin oxides and ester compounds such as ethyl silicate, dimethyl maleate, diethyl maleate and dioctyl phthalate; as well as organozirconium compounds such as organic zirconium compounds such as tetra-n-butoxyzirconium, ethylacetoacetate-zirconium-tri-n-butylate, bis(ethylacetoacetate)-zirconium-di-n-butylate, tris(ethylacetoacetate)-zirconium-n-butylate, tetrakis(n-propylacetoacetate)-zirconium, tetrakis(acetylacetoacetate)-zirconium, and tetrakis(ethylacetoacetate)-zirconium; organotitanium compounds such as tetra-i-propoxytitanium, bis(ethylacetoacetate)-titanium-di-i-propylate, bis(acetylacetate)-titanium-di-i-propylate and bis(acetylacetonate)-titanium-di-i-propylate organo-aluminum compounds such as tri-i-propoxyaluminum, ethylacetoacetate-aluminum-di-i-propylate, acetylacetonate-aluminum-di-i-propylate, bis(ethylacetoacetate)-aluminum-i-propylate, bis(acetylacetonate)-aluminum-i-propylate, tris-(ethylacetoacetate)-aluminum, tris(acetylacetonate)aluminum and bis(ethylacetoacetate)-aluminum-monoacetylacetonate; and partial hydrolysates of these organometallic compounds.

Of these organometallic compounds, preferred are ethylacetoacetate-zirconium-tri-n-butylate, bis(acetylacetonate)-titanium-di-i-propylate, ethylacetoacetate-aluminum-di-i-propylate and tris(acetylacetonate)-aluminum.

The above-mentioned hydrolytic catalysts can be used either alone or as a mixture of two or more of them, and can also be used as a mixture with zinc compounds or other reaction retardants.

The amount of the hydrolytic catalyst used is usually from 0.01 to 5 parts by weight, preferably from 0.1 to 5 parts by weight, and more preferably from 0.1 to 3 parts by weight, based on 100 parts by weight of the total amount of component (A) (converted to a completely hydrolyzed condensation product) and component (B). When the amount of the hydrolytic catalyst used is less than 0.01 part by weight, hydrolysis/condensation reaction of component (A) is liable to become insufficient. On the other hand, when it exceeds 5 parts by weight, the aqueous dispersion tends to deteriorate in storage stability, or cracks are liable to occur in the coating film.

Radical Polymerization Initiator (E)

The radical polymerization initiators used in the invention include, for example, water-soluble initiators such as persulfates such as potassium persulfate, sodium persulfate and ammonium persulfate, hydrogen peroxide, t-butyl hydroperoxide, t-butyl peroxy maleic acid, succinic peroxide and 2,2'-azobis[2-N-benzylamidino]propane hydrochloride; oil-soluble initiators such as benzoyl peroxide, cumene hydroperoxide, diisopropyl peroxydicarbonate, cumyl peroxyneodecanoate, cumyl peroxyoctoate and azobisisobutyronitrile; redox initiators in which reducing agents such as acidic sodium hydrogen sulfite, Rongalite and ascorbic acid are used together.

The amount of the radical polymerization initiator used is from 0.01 to 5 parts by weight and preferably from 0.05 to 4 parts by weight, based on 100 parts by weight of the total amount of component (A)(converted to a completely hydrolyzed condensation product) and component (B). When the amount of the radical polymerization initiator used is less than 0.01 part by weight, the polymerization reaction of radical polymerizable monomer (B) is liable to be deactivated in the course thereof. On the other hand, when it exceeds 5 parts by weight, the weather resistance of the coating film is liable to be deteriorated.

Component (F) Having Ultraviolet Absorption Action and/or Light Stabilization Action The component having "ultraviolet absorption action and/or light stabilization action" (hereinafter collectively referred to as "ultraviolet absorption/light stabilization action") as used in the invention is a concept including both (a) the component existing substantially separately from a produced composite polymer and (b) the component derived from a compound used as component (B) and constituting a constituent unit of a composite polymer dispersed in an aqueous medium.

There is no particular limitation on the compound having ultraviolet absorption/light stabilization action used in preparing the aqueous dispersion. There may be used any of the compounds having ultraviolet absorption/light stabilization action which have hitherto been used for coatings, synthetic rubbers, synthetic resins and synthetic fibers, for example, organic ultraviolet absorbing agents such as oxalic anilide-based, salicylic acid-based, benzophenone-based, triazine-based, benzotriazole-based and cyanoacrylate-based ultraviolet absorbing agents, inorganic ultraviolet absorbing agents such as titanium oxide, zinc oxide and cerium oxide, and light stabilizing agents such as organonickel compounds and hindered amine compounds.

Examples of the compounds (trade names in some cases) having ultraviolet absorption/light stabilization action are enumerated below, together with trade names and maker names for some of the compounds.

Examples of the organic ultraviolet absorbing agents include but are not limited to salicylic acid-based ultraviolet absorbing agents such as phenyl salicylate, p-t-butylphenyl salicylate, p-n-octylphenyl salicylate and 2,4-dihydroxyphenyl salicylate, and p-methacryloyloxyphenyl salicylate as a radical polymerizable monomer; benzophenone-based ultraviolet absorbing agents such as 2,4-dihydroxybenzophenone (UVINUL 3000, manufactured by BASF Japan Ltd.), 2-hydroxy-4-methoxybenzophenone (UVINUL M-40, manufactured by BASF Japan Ltd.), 2-hydroxy-4-n-oxtyloxybenzophenone (UVINUL 408, manufactured by BASF Japan Ltd.), 2-hydroxy-4-n-dodecyloxybenzophenone, 2,2'-dihydroxy-4-methoxy-benzophenone, 2,2'-dihydroxy-4,4'-dimethoxybenzophenone (UVINUL 3049, manufactured by BASF Japan Ltd.), 2-hydroxy-4-methoxy-5-sulfobenzophenone (UVINUL MS-40, manufactured by BASF Japan Ltd.), bis(2-methoxy-4-hydroxy-5-benzoylphenyl)-methane and 2,2',4,4'-tetrahydroxybenzophenone (UVINUL 3050, manufactured by BASF Japan Ltd.), and 2-hydroxy-4-methacryloyloxy-benzophenone as a radical polymerizable monomer; triazine-based ultraviolet absorbing agents such as a mixture of 2-[4-{(2-hydroxy-3-n-dodecyloxypropyl)oxy}-2-hydroxyphenyl]-4,6-bis(2,4-dimethylphenyl)-s-triazine and 2-[4-{(2-hydroxy-3-n-tridodecyloxypropyl)oxy}-2-hydroxy-phenyl]-4,6-bis(2,4-dimethylphenyl)-s-triazine (TINUVIN 400, manufactured by Ciba Specialty Chemicals K.K.) and 2-(4-i-octyloxy-2-hydroxyphenyl)-4,6-bis(2,4-dimethylphenyl)-s-triazine; benzotriazole-based ultraviolet absorbing agents such as 2-(2-hydroxy-5-methylphenyl)benzotriazole, 2-(2-hydroxy-5-t-butylphenyl)benzotriazole, 2-(2-hydroxy-3,5-di-t-butylphenyl)benzotriazole, 2-(2-hydroxy-3-t-butyl-5-methylphenyl)-5-chlorobenzotriazole, 2-(2-hydroxy-3,5-di-t-butylphenyl)-5-chlorobenzotriazole, 2-(2-hydroxy-3,5-di-t-amylphenyl)-2H-benzotriazole (TINUVIN 328, manufactured by Ciba Specialty Chemicals K.K.), 2-(2-hydroxy-4-n-octyloxy-phenyl)benzotriazole, 2-(2-hydroxy-3-(3,4,5,6-tetrahydro-phthalimidomethyl)-5-methylphenyl)benzotriazole, 2,2'-methylenebis[4-(1,1,3,3-tetramethylbutyl)-6-(2H-benzo-triazole-2-yl)phenol], 2,2'-methylenebis[4-ethanol-6-(2H-benzotriazole-2-yl)phenol], i-octyl-3-[3-(2H-benzotriazole-2-yl)-5-t-butyl-4-hydroxyphenyl] propionate (TINUVIN 384, manufactured by Ciba Specialty Chemicals K.K.), 2-[2-hydroxy-3,5-di(1,1-dimethylbenzyl)phenyl]-2H-benzotriazole (TINUVIN 900, manufactured by Ciba Specialty Chemicals K.K.), 2-[2-hydroxy-3-dimethylbenzyl-5-(1,1,3,3-tetramethylbutyl)-phenyl]-2H-benzotriazole (TINUVIN 928, manufactured by Ciba Specialty Chemicals K.K.), a condensation product of methyl-3-[3-t-butyl-5-(2H-benzotriazole-2-yl)-4-hydroxy-phenyl] propionate and polyethylene glycol (TINUVIN 1130, manufactured by Ciba Specialty Chemicals K.K.), 3-[3-(2H-benzotriazole-2-yl)-5-t-butyl-4-hydroxyphenyl]propanol and an aqueous dispersion of 2-(2-hydroxy-3-t-butyl-5-methylphenyl)-5-chlorobenzotriazole (ADK STAB LX-301, manufactured by Asahi Denka Kogyo K.K.), and, as radical polymerizable monomers, 2-(2-hydroxy-3-methacryloyloxyphenyl)-2H-benzotriazole, 2-(2-hydroxy-4-methacryloyloxyphenyl)-2H-benzotriazole, 2-(2-hydroxy-5-methacryloyloxyphenyl)-2H-benzotriazole, 2-(2-hydroxyphenyl)-5-methacryloyloxy-2H-benzotriazole, 2-(2-hydroxy-3-methacryloyloxy-5-methylphenyl)-2H-benzotriazole, 2-(2-hydroxy-5-methacryloyloxy-3-methylphenyl)-2H-benzotriazole, 2-(2-hydroxy-3-methylphenyl)-5-methacryloyloxy-2H-benzotriazole, 2-(2-hydroxy-5-methylphenyl)-5-methacryloyloxy-2H-benzotriazole, 2-(2-hydroxy-3-methacryloyloxy-5-t-butylphenyl)-2H-benzotriazole, 2-(2-hydroxy-5-methacryloyloxy-3-t-butylphenyl)-2H-benzotriazole, 2-(2-hydroxy-3-t-butylphenyl)-5-methacryloyloxy-2H-benzotriazole, 2-(2-hydroxy-5-t-butyl-phenyl)-5-methacryloyloxy-2H-benzotriazole, 2-[2-hydroxy-3-(2-methacryloyloxyethyl)phenyl]-2H-benzotriazole, 2-[2-hydroxy-4-(2-methacryloyloxyethyl)phenyl]-2H-benzotriazole, 2-[2-hydroxy-5-(2-methacryloyloxyethyl)phenyl]-2H-benzotriazole (RUVA-93, manufactured by Otsuka Chemical Co., Ltd.), 2-(2-hydroxyphenyl)-5-(2-methacryloyloxyethyl)-2H-benzotriazole, 2-[2-hydroxy-3-(2-methacryloyloxyethyl)-5-methyl-phenyl]-2H-benzotriazole, 2-[2-hydroxy-5-(2-methacryloyloxyethyl)-3-methylphenyl]-2H-benzotriazole, 2-(2-hydroxy-3-methylphenyl)-5-(2-methacryloyloxyethyl)-2H-benzotriazole, 2-(2-hydroxy-5-methylphenyl)-5-(2-methacryloyloxyethyl)-2H-benzotriazole, 2-[2-hydroxy-3-(2-methacryloyloxyethyl)-5-t-butylphenyl]-2H-benzotriazole, 2-[2-hydroxy-5-(2-methacryloyloxyethyl)-3-t-butylphenyl]-2H-benzotriazole, 2-(2-hydroxy-3-t-butylphenyl)-5-(2-methacryloyloxyethyl)-2H-benzotriazole, 2-(2-hydroxy-5-t-butylphenyl)-5-(2-methacryloyloxyethyl)-2H-benzotriazole, 2-(2-hydroxy-3-methacryloylaminophenyl)-2H-benzotriazole, 2-(2-hydroxy-4-methacryloylaminophenyl)-2H-benzotriazole, 2-(2-hydroxy-5-methacryloylaminophenyl)-2H-benzotriazole, 2-(2-hydroxyphenyl)-5-methacryloylamino-2H-benzotriazole, 2-(2-hydroxy-3-methacryloylamino-5-methylphenyl)-2H-benzotriazole, 2-(2-hydroxy-5-methacryloylamino-3-methylphenyl)-2H-benzotriazole, 2-(2-hydroxy-3-methylphenyl)-5-methacryloylamino-2H-benzotriazole, 2-(2-hydroxy-5-methylphenyl)-5-methacryloylamino-2H-benzotriazole, 2-(2-hydroxy-3-methacryloylamino-5-t-butylphenyl)-2H-benzotriazole, 2-(2-hydroxy-5-methacryloylamino-3-t-butylphenyl)-2H-benzotriazole, 2-(2-hydroxy-3-t-butylphenyl)-5-methacryloylamino-2H-benzotriazole and 2-(2-hydroxy-5-t-butylphenyl)-5-methacryloylamino-2H-benzotriazole; and cyanoacrylate-based ultraviolet absorbing agents such as 2-ethylhexyl-2-cyano-3,3'-diphenyl acrylate (UVINUL 3039, manufactured by BASF Japan Ltd.) and ethyl-2-cyano-3,3'-diphenyl acrylate (UVINUL 3035, manufactured by BASF Japan Ltd.).

Further, examples of the hindered amine-based light stabilizing agents include but are not limited to bis(2,2,6,6-tetramethyl-4-piperidyl) sebacate, a mixture of bis(1,2,2,6,6-pentamethyl-4-piperidyl) sebacate and 1-(methyl)-8-(1,2,2,6,6-pentamethyl-4-piperidyl) sebacate (TINUVIN 292, manufactured by Ciba Specialty Chemicals K.K.), bis(2,2,6,6-tetramethyl-1-n-octyloxy-4-piperidyl) sebacate (TINUVIN 123, manufactured by Ciba Specialty Chemicals K.K.), bis(1,2,2,6,6-pentamethyl-4-piperidyl)-[{3,5-bis(1,1-di-methylethyl)-4-hydroxyphenyl}methyl]butyl malonate (TINUVIN 144, manufactured by Ciba Specialty Chemicals K.K.), TINUVIN 111FD (trade name, manufactured by Ciba Specialty Chemicals K. K.), tetrakis(2,2,6,6-tetramethyl-4-piperidyl-1,2,3,4-butane tetracarboxylate (ADK STAB LA-57, manufactured by Asahi Denka Kogyo K.K.), tetrakis (1,2,2,6,6-pentamethyl-4-piperidyl-1,2,3,4-butane tetracarboxylate (ADK STAB LA-52, manufactured by Asahi Denka Kogyo K.K.), a mixed 1,2,2,6,6-pentamethyl-4-piperidyl/tridecyl ester of 1,2,3,4-butanetetracarboxylic acid (ADK STAB LA-62, manufactured by Asahi Denka Kogyo K.K.), ADK STAB LA-67 (trade name, manufactured by Asahi Denka Kogyo K.K.), ADK STAB LA-63P (trade name, manufactured by Asahi Denka Kogyo K.K.), ADK STAB LA-68LD (trade name, manufactured by Asahi Denka Kogyo K.K.), 1-[2-{3-(3,5-di-t-butyl-4-hydroxyphenyl)propionyloxy}-ethyl]-4-[3-(3,5-di-t-butyl-4-hydroxyphenyl)propionyloxy]-2,2,6,6-tetramethylpiperidine (SANOL LS-2626, manufactured by SANKYO CO., LTD.), 4-benzoyloxy-2,2,6,6-tetramethyl-piperidine (SANOL LS-744, manufactured by SANKYO CO., LTD.), 8-acetyl-3-n-dodecyl-7,7,9,9-tetramethyl-1,3,8-triazaspiro-[4,5]-decane-2,4-dione (SANOL LS-440, manufactured by SANKYO CO., LTD.), poly[{6-(1,1,3,3-tetramethylbutyl)amino-1,3,5-triazine-2,4-diyl}{(2,2,6,6-tetramethyl-4-piperidyl)imino}-hexamethylene{(2,2,6,6-tetramethyl-4-piperidyl)imino}] (SANOL LS-944, manufactured by SANKYO CO., LTD.), and an aqueous dispersion of a mixture of 1,2,2,6,6-pentamethyl-4-piperidyl/tridecyl esters of 1,2,3,4-butanetetracarboxylic acid (ADK STAB LX-332, manufactured by Asahi Denka Kogyo K.K.), and 1,2,2,6,6-pentamethyl-4-piperidyl acrylate, 1,2,2,6,6-pentamethyl-4-piperidyl methacrylate (ADK STAB LA-82, manufactured by Asahi Denka Kogyo K.K.), 2,2,6,6-tetramethyl-4-piperidyl acrylate, 2,2,6,6-tetramethyl-4-piperidyl methacrylate (ADK STAB LA-87, manufactured by Asahi Denka Kogyo K.K.), 1,2,2,6,6-pentamethyl-4-iminopiperidyl methacrylate, 2,2,6,6-tetramethyl-4-iminopiperidyl methacrylate, 4-cyano-2,2,6,6-tetramethyl-4-piperidyl methacrylate and 4-cyano-1,2,2,6,6-pentamethyl-4-piperidyl methacrylate as radical polymerizable monomers.

Of these compounds having ultraviolet absorption/light stabilization action, preferred are the triazine-based, benzotriazole-based or cyanoacrylate-based organic ultraviolet absorbing agents having radical polymerizable properties or no radical polymerizable properties; the inorganic ultraviolet absorbing agents comprising fine particles of zinc oxide or fine particles of cerium oxide; and the hindered amine-based light stabilizing agents.

The average particle size of the fine particles of zinc oxide and the fine particles of cerium oxide is usually from 0.003 to 0.5 $\mu$m, and preferably from 0.005 to 0.2 $\mu$m.

The above-mentioned compounds having ultraviolet absorption/light stabilization action can be used either alone or as a mixture of two or more of them.

Flexibility at low temperatures is given to the coating film by using a liquid compound having a melting point of −5° C. or less and having no radical polymerizable properties as the compound having ultraviolet absorption/light stabilization action, so that good frost resistance, in addition to good weather resistance, can be imparted.

Further, when the component having ultraviolet absorption/light stabilization action is derived from the radical polymerizable monomer, the breeding of the compound having ultraviolet absorption/light stabilization action from the coating film is inhibited. As a result, excellent weather resistance can be maintained for a long period of time.

In the invention, the amount of the compound having ultraviolet absorption/light stabilization action used in the stage of the preparation of the aqueous dispersion is usually from 0.1 to 10 parts by weight, and preferably from 0.2 to 5 parts by weight, based on 100 parts by weight of the aqueous dispersion(solid matter).

Production of Aqueous Dispersion

The aqueous dispersion of the invention is produced by mixing and emulsifying the above-mentioned components (A) to (D) and component (F) as needed to reduce the particle size of an emulsion, as well as to allow hydrolysis of component (A) to proceed, adding the above-mentioned component (E) to allow polymerization of component (B) (these hydrolysis and condensation reaction and polymerization reaction are hereinafter collectively referred to as "condensation/polymerization reaction") to proceed.

In some cases, condensation reaction of the hydrolysate proceeds in the above-mentioned stage in which hydrolysis of component (A) is allowed to proceed by mixing and emulsification.

In the method for producing the aqueous dispersion of the invention, the polymerization of component (B) after the particle size reduction of the emulsion can be said to be a kind of mini-emulsion polymerization.

The above-mentioned mini-emulsion polymerization is emulsion polymerization in which component (B) is finely dispersed by emulsification in an aqueous medium usually to the average particle size of 0.5 $\mu$m or less, preferably to 0.3 $\mu$m or less, particularly preferably to 0.03 to 0.2 $\mu$m, and polymerized while maintaining that dispersed state.

In producing this aqueous dispersion, treatment for reducing the particle size of the emulsion may be carried out either at the same time that hydrolysis of component (A) is allowed to proceed, or after hydrolysis of component (A) has proceeded to some degree.

Water is a main component of the medium of the aqueous dispersion of the invention, and the amount thereof used is usually from 50 to 2,000 parts by weight, and preferably from 100 to 1,000 parts by weight, as the total amount of water previously added to component (A) and water added in mixing and emulsifying the respective components, based on 100 parts by weight of the total amount of component (A)(converted to a completely hydrolyzed condensation product) and component (B).

When the amount of water used is less than 50 parts by weight, there is the possibility of emulsification becoming difficult, or the stability of an emulsion after emulsification being lowered. On the other hand, exceeding 2,000 parts by weight results in an unfavorable reduction in productivity.

Mixing and emulsification of the respective components in preparing the aqueous dispersion can be carried out by use of conventional stirring means, and the mixing and emulsification and the particle size reduction of the emulsion can be carried out, for example, by use of a high pressure homogenizer, a homomixer and an ultrasonic dispersing device.

As to the reaction conditions of the condensation/polymerization reaction, the temperature is usually from 25 to 90° C., and preferably from 40 to 80° C., and the reaction time is usually from 0.5 to 15 hours, and preferably from 1 to 8 hours.

In this condensation/polymerization reaction, hydrolysis/condensation of organosilane (1) contained in component (A) and polymerization reaction of component (B) proceed at the same time in the emulsified state. When component (A) contains organosilane (1) and the partial condensation product, co-condensation reaction of the hydrolysate of organosilane (1) with the partial condensation product also concurrently proceeds in some cases, together with condensation reaction of the hydrolysate of organosilane (1) alone and partial condensation product alone. Such condensation/polymerization reaction forms an inter-penetrating polymer network (IPN) structure with a component (A)-derived organopolysiloxane component and a component (B)-derived vinyl polymer component mutually inter-penetrated, in the resulting composite polymer particle. Further, when component (B) contains a radical polymerizable monomer having a group which can form a siloxane bond, the component (A)-derived organopolysiloxane component and the component (B)-derived vinyl polymer component are chemically combined with each other, and further, chain transfer of reactive radicals occurs in polymerization of component (B) to cause chemical graft bonding of the vinyl polymer component to a organopolysiloxane chain in some cases.

When component (A) or component (B) contains an acidic group such as a carboxyl group or a carboxylic acid anhydride group in the condensation/polymerization reaction, it is preferred that a basic compound is added after the condensation/polymerization reaction to adjust the pH. When each of these components has a basic group such as an amino group or an amineimido group, it is preferred that an acidic compound is added after the condensation/ polymerization reaction to adjust the pH. Further, when each of these component has an acidic group and a basic group, and the ratio of either one is higher, it is preferred that an acidic compound or a basic compound is added according to the ratio of these groups after the condensation/ polymerization reaction to adjust the pH, thereby being able to enhance the hydrophilicity of the resulting composite polymer particles and to improve the dispersibility thereof.

The above-mentioned basic compounds used for pH adjustment include, for example, amines such as ammonia, methylamine, dimethylamine, trimethylamine, ethylamine, diethylamine, triethylamine, ethanolamine, diethanolamine and dimethylaminoethanol; and alkaline metal hydroxides such as potassium hydroxide and sodium hydroxide. The acidic compounds include, for example, inorganic acids such as hydrochloric acid, phosphoric acid, sulfuric acid and nitric acid; and organic acids such as formic acid, acetic acid, propionic acid, lactic acid, oxalic acid, citric acid, adipic acid, (meth)acrylic acid, maleic acid, fumaric acid and itaconic acid.

The pH of the aqueous dispersion after the above-mentioned pH adjustment is usually from 4 to 9, and preferably from 5 to 8.

The average particle size of the composite polymer particles contained in the aqueous dispersion thus obtained is preferably from 0.01 to 0.5 $\mu$m, and more preferably from 0.05 to 0.3 $\mu$m. The solid concentration of the aqueous dispersion is usually from 10% to 60% by weight, and preferably from 20% to 50% by weight. This solid concentration is usually adjusted by the amount of water.

Although the aqueous medium in the aqueous dispersion of the invention is essentially composed of water, it contains an alcohol or alcohols caused by hydrolysis of an alkoxyl group or alkoxyl groups in component (A). In particular, when $R^2$ in general formula (1) is a straight-chain or branched alkyl group having 1 to 4 carbon atoms, the amount of an alcohol or alcohols having a boiling point of less than 100° C. contained in the aqueous dispersion of the invention is required to be 0.1% to 2% by weight. it is preferably from 0.2% to 2% by weight, and more preferably from 0.5% to 2% by weight.

Less than 0.1% by weight results in unfavorable deterioration of leveling properties, whereas exceeding 2% by weight unfavorably results in unfavorable deterioration of anti-checking properties.

A film forming assistant for accelerating the formation of the coating film can also be added to the aqueous dispersion of the invention.

The film forming assistants include alcohols having a boiling point of 100° C. or more such as n-hexyl alcohol and benzyl alcohol; cellosolves such as methyl cellosolve, ethyl cellosolve, n-propyl cellosolve, i-propyl cellosolve, n-butyl cellosolve and n-hexyl cellosolve; carbitols such as methyl carbitol, ethyl carbitol and butyl carbitol; cellosolve acetates such as methyl cellosolve acetate and ethyl cellosolve acetate; carbitol acetates such as butyl carbitol acetate; and phosphates such as tri-n-butoxymethyl phosphate.

The amount of the film forming assistant added is usually 20% by weight or less, preferably 10% by weight or less, and more preferably 5% by weight or less, based on the whole aqueous dispersion.

In order to adjust the alcohol content within the range of the invention, the following methods are used:

(I) After polymerization, the pH is adjusted as needed, and then, when the alcohol content is larger than the range specified in the invention, it is reduced to the range specified in the invention by means such as dilution with an aqueous solvent and heating/distillation. In this case, it is preferred with respect to the stability of the aqueous dispersion that the alcohol content is reduced after pH adjustment. Methods for reducing the alcohol content by heating/distillation include the following methods:

(1) Evaporator Method: A method of removing an alcohol or alcohols by distillation by stirring under heating or at ordinary temperatures, while blowing a gas such as air or nitrogen gas into a reaction vessel under reduced or ordinary pressure. As the specific apparatus, a four neck flask used for polymerization can be used on a laboratory scale, and a reactor used for polymerization can be used as such subsequent to the polymerization on an industrial scale;

(2) Centrifugal Thin Film Method: A method of rotating a conical heat transfer surface to convert a solution to a thin film by centrifugal force, thereby evaporating an alcohol or alcohols. As the specific apparatus, there can be used an evaporator on a laboratory scale, and "Evapor" manufactured by OKAWARA MFG. CO., LTD. or a "centrifugal molecular distiller" manufactured by NIPPON SHARYO LTD. on an industrial scale;

(3) External Circulating Spray Method: A treating solution and a heating medium are allowed to flow alternately on surfaces of corrugated plates overlapped on one another. As the specific apparatus, there can be used "BUBB-LESS" manufactured by NISSO ENGINEERING CO., LTD.;

(4) Falling Thin Film Method: A method of evaporating an alcohol or alcohols, while allowing a treating solution to flow down in film form from a top of a group of heating pipes; and (5) Stirring Thin Film Method: A method of forcedly converting a treating solution to a thin film with a stirring blade installed in a cylindrical heating pipe to evaporate an alcohol or alcohols. As the specific apparatus, there can be used "Wiprene" and "Exeva" manufactured by SHINKO PANTEC CO., LTD.

Of these methods, (1) the evaporator method is preferred from the viewpoint that it necessitates no extra additional device for reducing the alcohol content by heating/ distillation. From the viewpoint of industrial production efficiency, (2) the centrifugal thin film method and (3) the external circulating spray method are preferred.

Water may also be evaporated to increase the solid concentration of the aqueous dispersion at the same time that the alcohol content is decreased by heating/distillation, as long as the stability of the aqueous dispersion is not deteriorated.

(II) After polymerization, the pH is adjusted as needed. Then, when the alcohol content is within the range specified in the invention, the dispersion can be used as such, as the aqueous dispersion of the invention. Even when the alcohol content is within the range specified in the invention, dilution with an aqueous solvent may be conducted, or water may be evaporated by heating/distillation to increase the solid concentration of the aqueous dispersion, as long as the alcohol content after treatment is within the range specified in the invention.

(III) After polymerization, the pH is adjusted as needed. Then, when the alcohol content is lower than the range specified in the invention, an alcohol is added to adjust the alcohol content within the range specified in the invention. In this case, it is preferred with respect to the stability of the aqueous dispersion that the alcohol is added after pH adjustment.

Other Additives

<Crosslinking Agents>

A crosslinking agent which can react with various functional groups introduced into the composite polymer can be added to the aqueous dispersion of the invention.

The crosslinking agents include, for example, melamine crosslinking agents, epoxy crosslinking agents, phenol resin crosslinking agents and oxazoline crosslinking agents. In particular, when the composite polymer contained in the aqueous dispersion has a keto group and/or an aldo group, a compound having two or more hydrazide groups in its molecule (hereinafter referred to as a "hydrazide crosslinking agent") is preferably used as the crosslinking agent.

The hydrazide crosslinking agents include, for example, a dicarboxylic acid dihydrazide having a total carbon number of 2 to 10, particularly 4 to 6, such as oxalic acid dihydrazide, malonic acid dihydrazide, succinic acid dihydrazide, glutaric acid dihydrazide, adipic acid dihydrazide, sebacic acid dihydrazide, phthalic acid dihydrazide, isophthalic acid dihydrazide, terephthalic acid dihydrazide, maleic acid dihydrazide, fumaric acid dihydrazide or itaconic acid dihydrazide; and a trifunctional or more functional hydrazide such as citric acid trihydrazide, nitriloacetic acid trihydrazide, cyclohexanetricarboxylic acid trihydrazide or ethylenediaminetetraacetic acid tetrahydrazide.

Of these hydrazide crosslinking agents, preferred are glutaric acid dihydrazide, adipic acid dihydrazide, sebacic acid dihydrazide and isophthalic acid dihydrazide.

The above-mentioned crosslinking agents can be used either alone or as a mixture of two or more of them.

With respect to the amount of the hydrazide crosslinking agent used in the invention, the equivalent ratio of the total amount of the keto groups and the aldo groups in the composite polymer to the amount of the hydrazide groups is usually from 1:0.1 to 1:5, preferably from 1:0.2 to 1:1.5, and more preferably from 1:0.5 to 1:1.0. When the above-mentioned equivalent ratio is less than this range, the water resistance and damage resistance of the coating film are deteriorated in some cases. On the other hand, when it exceeds this range, the water resistance and transparency of the coating film are deteriorated in some cases.

Further, the amount of the crosslinking agent other than the hydrazide crosslinking agent used is usually 50 parts by weight or less, and preferably 30 parts by weight or less, based on 100 parts by weight of the solid matter of the aqueous dispersion.

The crosslinking agent has the action that it is allowed to react with the keto or aldo groups in the composite polymer in the course of drying after application of the aqueous dispersion of the invention to form a network structure, thereby crosslinking the coating film. In the aqueous dispersion of the invention, inclusion of such a crosslinking agent allows crosslinking reaction to proceed rapidly at a low temperature of 100° C. or less, and also makes it possible to conduct crosslinking reaction at ordinary temperatures. Moreover, the crosslinking agent is also characterized by that this crosslinking reaction significantly improves the initial hardness of the coating film.

<β-Keto Compounds>

When the organometallic compound is used as the above-mentioned component (D), for example, a β-diketone and/or a β-ketoester (these compounds are hereinafter collectively referred to as a "β-keto compound") can be added to the aqueous dispersion of the invention in order to further improve storage stability.

The β-keto compounds include, for example, acetylacetone, methyl acetoacetate, ethyl acetoacetate, n-propyl acetoacetate, i-propyl acetoacetate, n-butyl acetoacetate, sec-butyl acetoacetate, t-butyl acetoacetate, hexane-2,4-dione, heptane-2,4-dione, heptane-3,5-dione, octane-2,4-dione, nonane-2,4-dione, 5-methylhexane-2,4-dione, malonic acid, oxalic acid, phthalic acid, glycolic acid, salicylic acid, aminoacetic acid, iminoacetic acid, ethylenediaminetetraacetic acid, glycol, catechol, ethylenediamine, 2,2-bipyridine, 1,10-phenanthroline, diethylenetriamine, 2-ethanolamine, dimethylglyoxime, dithizone, methionine and salicyladehyde.

Of these β-keto compounds, preferred are acetylacetone and ethyl acetoacetate.

The above-mentioned β-keto compounds can be used either alone or as a mixture of two or more of them.

The amount of the β-keto compound used is usually 2 moles or more, and preferably from 3 to 20 moles, per mole of organometallic compound. When the amount of the β-keto compound used is less than 2 moles, the effect of improving the storage stability of the resulting aqueous dispersion tends to be lowered.

<Resinous Additives>

A resinous additive such as a water-soluble polyester resin usually used in an aqueous coating, a water-soluble or water-dispersible epoxy resin, a water-soluble or water-dispersible acrylic resin, a carboxyl group-containing aromatic vinyl resin such as a styrene-maleic acid copolymer, and a urethane resin can be added to the aqueous dispersion of the invention.

These resinous additives can be used either alone or as a mixture of two or more of them.

The amount of the resinous additive added is usually 50 parts by weight or less, and preferably 30 parts by weight or less, based on 100 parts by weight of the total solid matter of the aqueous dispersion.

<Inorganic Compounds>

An inorganic compound can be added to the aqueous dispersion of the invention.

The inorganic compounds include, for example, $SiO_2$, $Al_2O_3$, $Al(OH)_3$, $Sb_2O_5$, $Si_3N_4$, $Sn—In_2O_3$, $Sb—In_2O_3$, $MgF$, $CeF_3$, $CeO_2$, $3Al_2O_3.2SiO_2$, $BeO$, $SiC$, $AlN$, $Fe$, $Fe_2O_3$, $Co$, $Co—FeO_x$, $CrO_2$, $Fe_4N$, $Ba$ ferrite, $SmCO_5$, $YCO_5$, $CeCO_5$, $PrCO_5$, $Sm_2CO_{17}$, $Nd_2Fe_{14}B$, $ZrO_2$, $Al_4O_3$, $\alpha—Si$, $SiN_4$, $CoO$, $Sb—SnO_2$, $Sb_2O_5$, $MnO_2$, $MnB$, $Co_3O_4$, $Co_3B$, $LiTaO_3$, $MgO$, $MgAl_2O_4$, $BeAl_2O_4$, $ZrSiO_4$, $ZnSb$, $PbTe$, $GeSi$, $FeSi_2$, $CrSi_2$, $CoSi_2$, $MnSi_{1.73}$, $Mg_2Si$, $\beta—B$, $BaC$, $BP$, $TiB_2$, $ZrB_2$, $HfB_2$, $Ru_2Si_3$, $BaTiO_3$, $PbTiO_3$, $BaO—Al_2O_3—SiO_2$, $Al_2TiO_5$, $Zn_2SiO_4$, $Zr_2SiO_4$, $2MgO_2—Al_2O_3—5SiO_2$, $Li_2O—Al_2O_3—4SiO_2$, Mg ferrite, Ni ferrite Ni—Zn ferrite, Li ferrite and Sr ferrite.

As the existing form of such an inorganic compound, there are a powder, an aqueous sol or colloid in which it is dispersed in water, or a solvent sol or colloid in which it is dispersed in a polar solvent such as isopropyl alcohol or a nonpolar solvent such as toluene. In the case of the solvent sol or colloid, it may be used after further dilution with water or the solvent, or may be used after surface treatment for improving the dispersibility.

When the inorganic compound is the aqueous sol or colloid, or the solvent sol or colloid, the solid concentration is preferably 40% by weight or less.

The above-mentioned inorganic compounds can be used either alone or as a mixture of two or more of them. The amount of the inorganic compound added (solid content) is usually 500 parts by weight or less, and preferably 400 parts by weight or less, based on the total polymer components contained in the aqueous dispersion.

<Fillers>

A filler can also be separately added to and dispersed in the aqueous dispersion of the invention, for coloring the resulting coating film and increasing the thickness thereof.

The fillers include, for example, water-insoluble organic pigments and inorganic pigments, granular, fibrous or scaly ceramics, metals and alloys, and oxides, hydroxides, carbides, nitrides and sulfides of these metals.

Specific examples of the above-mentioned fillers include iron, copper, aluminum, nickel, silver, zinc, ferrite, carbon black, stainless steel, silicon dioxide, titanium dioxide for pigments, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine, deep blue, pigment green, rocky blue, cobalt blue, cerulean blue, copper borate, molybdenum blue, copper sulfide, cobalt purple, mars violet, manganese purple, pigment violet, lead suboxide, calcium plumbate, zinc yellow, lead sulfide, chrome yellow, yellow soil, cadmium yellow, strontium yellow, titanium yellow, litharge, pigment yellow, copper suboxide, cadmium red, selenium red, chrome vermilion, Indian red, zinc white, antimony white, basic lead sulfate, titanium white, lithopone, lead silicate, zirconium oxide, tungsten white, lead, zinc white, Bantison white, lead phthalate, manganese white, lead sulfate, graphite, bone black, diamond black, Thermatomic black, plant black, potassium titanate whisker and molybdenum disulfide.

These fillers can be used alone or as a mixture of two or more of them. The amount of the filler added is usually 300 parts by weight or less based on 100 parts by weight of the total solid matter of the aqueous dispersion.

<Leveling Agents>

In order to more improve coating properties of the aqueous dispersion of the invention, a leveling agent can be added to the aqueous dispersion.

Of the leveling agents, fluorine leveling agents (trade names, hereinafter the same) include, for example, BM1000 and BM1100 manufactured by BM-Chemie; Efca 772 and Efca 777 manufactured by Efca Chemicals; a POLYFLOW series manufactured by KYOEISHA CHEMICAL Co., Ltd.; an FC series manufactured by SUMITOMO 3M LIMITED; and a Fluonal TF series manufactured by Toho Chemical, and silicone leveling agents include, for example, a BYK series manufactured by BYK Chemie; a Sshmego series manufactured by Sshmegmann; and Efca 30, Efca 31, Efca 34, Efca 35, Efca 36, Efca 39, Efca 83, Efca 86 and Efca 88 manufactured by Efca Chemicals. Ether or ester leveling agents include, for example, Carphynol manufactured by Nisshin Chemical; and Emargen and Homogenol manufactured by KAO CORPORATION.

These leveling agents can be used either alone or as a mixture of two or more of them.

The amount of the leveling agent added is usually 5% by weight or less, and preferably 3% by weight or less, based on the whole aqueous dispersion.

<Additives Other Than the Above>

Further, another additive can also be added to the aqueous dispersion of the invention, as desired. Such additives include surfactants, silane coupling agents, titanium coupling agents and dyes, as well as dehydrating agents such as methyl orthoformate, methyl orthoacetate and tetraethoxysilane; dispersing agents such as poly(oxyethylene alkyl ethers), poly(oxyethylene alkyl phenyl ethers), poly (oxyethylene fatty acid esters), polycarboxylic acid type polymer surfactants, polycarboxylates, polyphosphates, polyacrylates, polyamide ester salts and polyethylene glycol; thickening agents such as cellulose derivatives such as methyl cellulose, ethyl cellulose, hydroxyethyl cellulose, hydroxypropyl cellulose and hydroxypropylmethyl cellulose, castor oil derivatives and ferrosilicates; inorganic foaming agents such as ammonium carbonate, ammonium bicarbonate, ammonium nitrite, sodium boron hydride and calcium azide; and organic foaming agents such as azo compounds such as azobisisobutyronitrile, hydrazine compounds such as diphenylsulfone-3,3'-disulfohydrazine, semicarbazide compounds, triazole compounds and N-nitroso compounds.

Coated Products

The coated product of the invention is one in which a coating containing the aqueous dispersion of the invention is applied onto a base material.

When the aqueous dispersion of the invention is applied onto the base material, a coating film having a thickness of about 1 to about 40 $\mu$m with single coating application or having a thickness of about 2 to about 80 $\mu$m with double or triple coating application can be formed by using a brush, a roll coater, a flow coater, a centrifugal coater or an ultrasonic coater, or by a coating process such as dip coating, flow coating, spraying, a screening process, electric deposition or vapor deposition.

Then, the coating film can be formed on various base materials by drying at ordinary temperature or drying by heating at a temperature of about 30 to about 200° C. for about 10 to about 60 minutes.

The base materials to which the aqueous dispersions of the invention are applicable include, for example, metals such as iron, aluminum and stainless steel; inorganic ceramic materials such as cement, concrete, ALC, flexible boards, mortar, slate, gypsum, ceramics and brick; formed articles of plastics such as phenol resins, epoxy resins, polyesters such as polyethylene terephthalate (PET), polycarbonates, polyethylene, polypropylene, ABS resins (acrylonitrile-butadiene-styrene resins) and polymethyl methacrylate (PMMA); films of plastics such as polyethylene, polypropylene, polyvinyl alcohol, polycarbonates, PET, polyurethanes and polyamides; and wood, paper and glass. Further, the aqueous dispersion of the invention is also useful for recoating a deteriorated coating film.

For the purposes of base preparation, improvement in adhesion, sealing of porous base materials, smoothing and patterning, these base materials can also previously be surface treated.

The surface treatment to the metallic base materials includes, for example, polishing, degreasing, plating treatment, chromate treatment, flaming treatment and coupling treatment, and the surface treatment to the plastic base materials includes, for example, blast treatment, chemical treatment, degreasing, flaming treatment, oxidation treatment, vapor treatment, corona discharge treatment, ultraviolet irradiation treatment, plasma treatment and ion treatment. The surface treatment to the inorganic ceramic base materials includes, for example, polishing, sealing and patterning, and the surface treatment to the woody base materials includes, for example, polishing, sealing and insect proofing. The surface treatment to the paper base materials includes, for example, sealing and insect proofing, and the surface treatment to the deteriorated coating films includes, for example, polishing.

A coating operation of the aqueous dispersion of the invention varies depending on the kind and state of base material and the coating method. For example, in the case of the metallic base material, a primer is used, if rust prevention is required. In the case of the inorganic ceramic base material, a primer is usually used, because the opacifying properties of the coating film are different depending on characteristics (such as surface roughness, impregnating ability and alkalinity) of the base material. In recoating of a deteriorated coating film, when the old coating film is significantly deteriorated, a primer is used. In the case of the other base materials such as plastics, wood and glass, a primer may be used or not, depending on their use.

There is no particular limitation on the kind of primer, which can be appropriately selected according to the kind of base material and the purpose of use of the resulting coated product, as long as it has the action of improving adhesion between the coating composition and the base material. The primers can be used either alone or as a mixture of two or more of them, and may be either an enamel type containing a coloring component such as a pigment or a clear type not containing the coloring component.

The primers include, for example, alkyd resins, aminoalkyd resins, epoxy resins, polyesters, acrylic resins, urethane resins, fluororesins, acrylic silicone resins, acrylic emulsions, epoxy emulsions, polyurethane emulsions and polyester emulsions. When adhesion between the base material and the coating film is required under severe conditions, various functional groups can be given to these primers. Such functional groups include, for example, a hydroxyl group, a carboxyl group, a carbonyl group, an amido group, an amine group, a glycidyl group, an alkoxysilyl group, an ether bond and an ester bond.

Further, a clear layer comprising a siloxane resin coating such as a stable dispersion of colloidal silica and a siloxane resin described, for example, in U.S. Pat. 3,986,997 and 4,027,073 can also be formed on a surface of the coating film formed from the aqueous dispersion of the invention, for the purpose of more improving the wear resistance and luster of the coating film.

The forms of the coated products in which the aqueous dispersions of the invention are applied onto the base materials include the following:

(a) Base material/aqueous dispersion (clear or enamel);
(b) Base material/aqueous dispersion (enamel)/another coating material (clear); and
(c) Base material/aqueous dispersion (clear or enamel)/another organic coating/aqueous dispersion (clear).

In the case of the above (a) to (c), it is as described above that the base material can be previously provided with the primer layer as needed.

The aqueous dispersion of the invention is excellent in storage stability, is excellent in the balance of performances such as leveling properties, anti-checking properties, adhesion, water resistance, organic chemical resistance, stain resistance, weather resistance and frost resistance, moreover, can form a coating film which is transparent and high in hardness, and can further maintain these excellent performances for a long period of time. In particular, the aqueous dispersion is useful as a coating material and a coating.

Further, according to the invention, a sufficient amount of the polysiloxane component can be compounded/integrated in the composite polymer particles, while maintaining good polymerization stability and storage stability, to provide the aqueous dispersion having the above-mentioned excellent performances.

The mode for carrying out the present invention will be illustrated with reference to examples in more detail below, but the present invention is not limited by these examples at all.

Parts and percentages in examples and comparative examples are on a weight basis unless otherwise noted. Various measurements and evaluations in examples and comparative examples were conducted by the following methods:

(1) Average Particle Size

The average particle size was measured with a dynamic light scattering particle size measuring device, "LPA-3100" manufactured by OTSUKA ELECTRONICS CO., LTD.

(2) Polymerization Stability

An aqueous dispersion (100 g) after polymerization was filtered through a 120-mesh stainless steel wire cloth filter, and the aggregate left on the wire cloth filter was dried at 180° C. for 20 minutes. When the weight of the resulting dried product was 0.1 g or less, the polymerization stability of the dispersion was evaluated as "good".

(3) Storage Stability

An aqueous dispersion was sealed in a plastic bottle, and allowed to stand at 50° C. for 1 month. Then, the appearance of the aqueous dispersion was visually observed, and the thickening rate (=viscosity after standing/viscosity before standing) was measured. The storage stability of the aqueous dispersion was evaluated based on the following criteria:

○: No change in appearance was observed, and the thickening rate was less than 1.3.

Δ: A change in appearance was partly observed, and the thickening rate was from 1.3 to less than 2.0.

X: A significant change in appearance and gelation were observed, or the thickening rate was 2.0 or more.

(4) Adhesion

A cross-cut (100 squares) adhesion test (tape peeling test) was conducted three times according to JIS K5400, and the adhesion was based on the average thereof.

(5) Hardness

The hardness was evaluated by the pencil hardness according to JIS K5400.

(6) Water Resistance

After a test piece was immersed in tap water at room temperature for 60 days, the state of a coating film was visually observed. The water resistance was evaluated based on the following criteria:

○: No change in appearance was observed.

X: A change in appearance was observed.

(7) Organic Chemical Resistance

On a coating film, 2 cc of isopropyl alcohol was dropped, and wiped off after 5 minutes. Then, the state of the coating film was visually observed. The organic chemical resistance was evaluated based on the following criteria:

○: No change in appearance was observed.

X: A change in appearance was observed.

(8) Stain Resistance

After coated with a paste composed of a mixture of carbon black/kerosene=½ (in weight ratio) and left at room temperatures for 24 hours, a coating film was rinsed with water using a sponge. The stained state of the coating film was visually observed, and evaluated based on the following criteria:

○: Not stained.
Δ: Slightly stained.
X: Terribly stained.

(9) Weather Resistance (1)

An irradiation test was carried out with a sunshine weather meter according to JIS K5400, and the appearance (cracking, peeling, etc.) of a coating film was visually observed. The weather resistance was evaluated based on the following criteria:

⊚: No change in appearance was observed even when the coating film was irradiated for 5,000 hours or more.

○: A change in appearance was observed when the coating film was irradiated for 3,000 to less than 5,000 hours.

Δ: A change in appearance was observed when the coating film was irradiated for 2,000 to less than 3,000 hours.

X: A change in appearance was observed when the coating film was irradiated for less than 2,000 hours.

(10) Frost Resistance

The appearance of a coating film was observed according to JIS A1435 (frozen in air/thawed in water), and the frost resistance was evaluated based on the following criteria:

⊚: No change in appearance was observed even when freezing and thawing were repeated 300 cycles.

○: No change in appearance was observed when freezing and thawing were repeated 200 to less than 300 cycles.

X: A change in appearance was observed when freezing and thawing were repeated less than 200 cycles.

(11) Measurement of Alcohol Amount

The concentration of an alcohol or alcohols contained in 2 μl of an aqueous dispersion was measured with a G6800 gas chromatograph (manufactured by YANAKO Analytical Instruments Co.) equipped with a fused silica capillary column filled with PEG 20M, using N,N-dimethylformamide containing 20 ppm of decane as an internal standard.

(12) Weather Resistance (2)

White enamel (PWC (pigment content by weight)=40%) containing a silicone acrylic emulsion (B7302, manufactured by JSR CORPORATION) as varnish was applied onto a hard aluminum plate in an amount of 50 g/m² on a dry weight basis, and a coating material to be evaluated was applied onto the hard aluminum plate with a spray gun in an amount of 25 g/m² on a dry weight basis, followed by heating at 140° C. for 4 hours in a gear oven to prepare a test sample.

An irradiation test was carried out for 6,000 hours with a sunshine weather meter according to JIS K5400, and the appearance (cracking, peeling, etc.) of a coating film was observed visually and through a 20-power magnifier. The weather resistance was evaluated based on the following criteria:

○: No change in appearance was observed through the 20-power magnifier.

Δ: Cracks were observed through the 20-power magnifier, but no change was visually observed.

X: A change in appearance was visually observed.

(13) Leveling Property

A test piece was prepared in the same manner as with the test piece used in the evaluation of weather resistance (2), and the texture of a coated surface of the test piece was visually evaluated. The leveling property was evaluated based on the following criteria:

○: Excellent in the leveling property.

X: Poor in the leveling property, or orange peels were observed.

(14) Anti-Checking Property

A coating material to be evaluated was applied onto a glass plate with a 100-μm applicator, and heated at 140° C. for 4 minutes in a gear oven to prepare a test piece. Cracks in a coated surface of the test piece were visually observed, and the anti-checking property was evaluated based on the following criteria:

○: Excellent in the anti-checking property.

X: Poor in the anti-checking property.

EXAMPLES 1 to 7 AND COMPARATIVE EXAMPLE 1

A homogeneous solution obtained by mixing component (A), component (B) and component (F) (excepting Comparative Example 1) was cooled with ice, and then, component (C) and water were added thereto, according to the polymerization formulation shown in Table 1. After emulsification by mixing, the resulting emulsion was poured into a product hopper. The particle size of the emulsion was reduced with a high-pressure homogenizer (Microfluidizer M-110Y; manufactured by Mizuho Industrial Co., Ltd.) by applying a driving air of 4 kgf/cm² with stirring, and hydrolysis of component (A) was allowed to proceed. The average particle size of the emulsion at this time was 0.13 μm. Then, the resulting emulsified product was poured into a separable flask, and component (E) shown in Table 1 was added with stirring. After nitrogen replacement, the mixture was heated at 70° C. to conduct reaction for 4 hours, thereby allowing hydrolysis/condensation reaction of component (A) and polymerization reaction of component (B) to proceed. After cooling, the pH of the system was adjusted to 6.5 with a 10% aqueous solution of ammonia, and component (F) in the compounding formulation shown in Table 1 was added depending on the circumstances, thereby obtaining an aqueous dispersion of composite polymer particles. After the pH adjustment, low boiling components were removed by distillation in the same manner as with Examples 23 and 24 described later to adjust the concentration of an alcohol or alcohols having a boiling point of 100° C. or less in the aqueous dispersion. Results of the polymerization described above are summarized in Table 1.

COMPARATIVE EXAMPLE 2

Component (C) and water shown in Table 1 were added to a homogeneous solution obtained by mixing component (A), component (B) and component (F), according to the polymerization formulation shown in Table 1. After emulsification by mixing, the resulting emulsion was poured into a separable flask, and component (E) shown in Table 1 was added with stirring. After nitrogen replacement, the mixture was heated at 70° C. to conduct reaction for 4 hours, thereby allowing hydrolysis/condensation reaction of component (A) and polymerization reaction of component (B) to proceed. After cooling, the pH of the system was adjusted to 6.5 with a 10% aqueous solution of ammonia, thereby obtaining an aqueous dispersion of composite polymer particles. After the pH adjustment, low boiling components were removed by distillation in the same manner as with Examples 23 and 24 described later to adjust the concentration of an alcohol or alcohols having a boiling point of 100° C. or less in the aqueous dispersion. Results of the polymerization described above are summarized in Table 1.

COMPARATIVE EXAMPLE 3

As component (C), two parts of a 20% aqueous solution of LATEMUL S-180A (manufactured by KAO CORPORATION), a reactive anionic surfactant, was mixed with 50 parts of water, and heated at 80° C. Then, 2 parts of a 2% aqueous solution of ammonium persulfate was added thereto as component (E). Five minutes after that, a mixed solution of 5 parts of methyl methacrylate, 9 parts of cyclohexyl methacrylate, 3 parts of n-butyl acrylate and 2 parts of methacrylic acid as component (B) and 0.2 part of HALS1, a hindered amine-based light stabilizing agent, as component (F), and a mixed solution of 1 part of a 20% aqueous solution of LATEMUL S-180A as component (C), 3 parts of a 2% aqueous solution of ammonium persulfate as component (E) and 9 parts of water were separately added dropwise for 40 minutes. The temperature of the reaction solution was maintained at 80° C. during the addition. Then, the reaction solution was stirred at 80° C. for 30 minutes to perform polymerization.

Thereafter, a mixed solution of 20 parts of methyl methacrylate, 30 parts of cyclohexyl methacrylate, 23 parts of n-butyl acrylate and 1.5 parts of methacrylic acid as component (B) and 0.7 part of the above-mentioned hindered amine-based light stabilizing agent as component (F), 4 parts of a 20% aqueous solution of LATEMUL S-180A as component (C), a mixed solution of 11 parts of a 2% aqueous solution of ammonium persulfate as component (E) and 25 parts of water, and a mixed solution of 0.2 part of 3-trimethoxysilylpropyl methacrylate, 4 parts of dimethyldimethoxysilane and 4 parts of methyltrimethoxysilane as component (A) were separately added dropwise for 160 minutes. The temperature of the reaction solution was maintained at 80° C., and the pH was kept at 4 or less during the addition. Then, the reaction solution was stirred at 80° C. for 120 minutes, thereby allowing hydrolysis/condensation reaction of component (A) and polymerization reaction of component (B) to proceed. After cooling, the pH of the system was adjusted to 6.5 with a 10% aqueous solution of ammonia to obtain an aqueous dispersion of composite polymer particles. After the pH adjustment, low boiling components were removed by distillation in the same manner as with Examples 23 and 24 described later to adjust the concentration of an alcohol or alcohols having a boiling point of 100° C. or less in the aqueous dispersion. Results of the polymerization described above are summarized in Table 1.

TABLE 1

|  | Example |  |  |  |  |  |  | Comparative Example |  |  |
|---|---|---|---|---|---|---|---|---|---|---|
|  | 1 | 2 | 3 | 4 | 5 | 6 | 7 | 1 | 2 | 3 |
| Polymerization formulation (parts) |  |  |  |  |  |  |  |  |  |  |
| Component (A): |  |  |  |  |  |  |  |  |  |  |
| X40-9220 (*1) | 20 | — | 35 | — | 25 | 16 | 10 | 10 | — | — |
| Methyltrimethoxysilane | — | 10 | — | 18 | 15 | — | 10 | — | 10 | 4 |
| Dimethyldimethoxysilane | — | — | 5 | 2 | 10 | 4 | — | — | 10 | 4 |
| Component (B): |  |  |  |  |  |  |  |  |  |  |
| Methyl methacrylate | 44 | 49 | 28 | 40 | 28 | 50 | 50 | 49 | 44 | 25 |
| n-Butyl acrylate | 30 | — | 25 | — | 20 | — | 10 | — | 30 | 26 |
| 2-Ethylhexyl acrylate | — | 35 | — | 30 | — | 23 | 10 | 35 | — | — |
| Cyclohexyl methacrylate | — | — | — | — | — | — | — | — | — | 39 |
| 2-Hydroxyethyl methacrylate | 2 | 2 | 2 | 1 | 1 | 2 | 3 | 2 | 2 | — |
| Diacetoneacrylamide | 2 | 2 | — | 4 | — | 3 | 5 | 2 | 2 | — |
| Acrylic acid (*2) | 2 | — | 2 | 2 | — | 2 | 2 | — | 2 | — |
| Methacrylic acid (*2) | — | 2 | — | — | 1 | — | — | 2 | — | 3.5 |
| 3-trimethoxysilylpropyl methacrylate | 0.4 | 0.5 | 1 | — | 0.5 | 0.6 | — | 0.5 | 0.4 | 0.2 |
| Component (C): |  |  |  |  |  |  |  |  |  |  |
| Sodium dodecylbenzenesulfonate | 1 | 0.5 | 0.5 | 1 | 0.5 | 1 | 1 | 0.5 | 1 | — |
| Emargen 920 (*3) | — | 0.2 | — | — | 0.5 | — | — | 0.2 | — | — |
| LEVENOL WZ (*4) | — | 0.3 | — | — | — | — | — | 0.3 | — | — |
| LATEMUL S-180A (*5) | — | — | — | — | — | — | — | — | — | 1.3 |
| Component (E): |  |  |  |  |  |  |  |  |  |  |
| Potassium persulfate | 0.3 | — | 0.5 | 0.3 | — | 0.5 | 0.3 | — | 0.3 | — |
| Ammonium persulfate | — | 0.3 | — | — | 0.3 | — | — | 0.3 | — | 0.3 |
| Component (F): |  |  |  |  |  |  |  |  |  |  |
| UVA 1 | 1 | — | — | — | — | — | — | — | 1 | — |
| UVA 2 | — | 2 | — | — | — | — | — | — | — | — |
| UVA 3 | — | — | 2 | — | — | — | — | — | — | — |
| UVA 4 | — | — | — | 3 | — | — | — | — | — | — |
| UVA 5 | — | — | — | — | 1 | — | — | — | — | — |
| HALS 1 | 1 | — | — | — | — | 2 | 1 | — | 2 | 1 |
| HALS 2 | — | 2 | — | — | — | — | — | — | — | — |
| HALS 3 | — | — | 1 | — | — | — | — | — | — | — |
| Compounding formulation (parts) |  |  |  |  |  |  |  |  |  |  |
| UVA 6 | — | — | — | — | 1 | — | — | — | — | — |
| UVA 7 | — | — | — | — | 3 | — | — | — | — | — |

TABLE 1-continued

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| HALS 4 | — | — | — | 1 | — | — | 1 | — | — | — |
| Results of evaluations | | | | | | | | | | |
| Solid concentration (%) | 30 | 30 | 35 | 30 | 30 | 35 | 30 | 30 | 30 | 44 |
| Average particle size (μm) | 0.12 | 0.10 | 0.20 | 0.09 | 0.15 | 0.10 | 0.11 | 0.10 | 0.30 | 0.10 |
| Polymerization stability | Good | Good | Good | Good | Good | Good | Good | Good | Poor | Good |
| Storage stability | ○ | ○ | ○ | ○ | ○ | ○ | ○ | ○ | X | Δ |
| Alcohol concentration (%) | 0.6 | 0.5 | 1.2 | 0.7 | 1.8 | 0.7 | 0.6 | 0.4 | 0.7 | 0.4 |

The contents of the compounds of component (F) used in Examples 1 to 7 and Comparative Examples 2 and 3, which are represented by abbreviations, are described below:

UVA 1: A mixture of 2-[4-{(2-hydroxy-3-n-dodecyloxy-propyl)oxy}-2-hydroxyphenyl]-4,6-bis(2,4-dimethylphenyl)-s-triazine and 2-[4-{(2-hydroxy-3-n-tridodecyloxypropyl)oxy}-2-hydroxyphenyl]-4,6-bis(2,4-dimethylphenyl)-s-triazine (melting point: −5° C. or lower, trade name: TINUVIN 400, manufactured by Ciba Specialty Chemicals K.K.);

UVA 2: i-Octyl-3-[3-(2H-benzotriazole-2-yl)-5-t-butyl-4-hydroxyphenyl] propionate (melting point: −5° C. or lower, trade name: TINUVIN 384, manufactured by Ciba Specialty Chemicals K.K.);

UVA 3: 2-[2-Hydroxy-5-(2-methacryloyloxyethyl)-phenyl]-2H-benzotriazole (melting point: ordinary temperature or higher, trade name: RUVA-93, manufactured by Otsuka Chemical Co., Ltd.);

UVA 4: 2-[2-Hydroxy-5-(2-methacryloyloxyethyl)-3-t-butylphenyl]-2H-benzotriazole (melting point: ordinary temperature or higher, trade name: tBu-RUVA, manufactured by Otsuka Chemical Co., Ltd.);

UVA 5: 2-Ethylhexyl-2-cyano-3,3'-diphenyl acrylate (melting point: −5° C. or lower, trade name: Uvinul 3039, manufactured by BASF Japan Ltd.);

UVA 6: An aqueous dispersion of 2-(2-hydroxy-3-t-butyl-5-methylphenyl)-5-chlorobenzotriazole (melting point: ordinary temperature or higher, trade name: ADK STAB LX-301, manufactured by Asahi Denka Kogyo K.K.);

UVA 7: An aqueous dispersion of fine particles of zinc oxide (melting point: ordinary temperature or higher; trade name: ZW-143, manufactured by SUMITOMO OSAKA CEMENT CO. LTD.);

HALS 1: Bis(2,2,6,6-tetramethyl-1-n-octyloxy-4-piperidyl) sebacate (melting point: −5° C. or lower, trade name: TINUVIN 123, manufactured by Ciba Specialty Chemicals K.K.);

HALS 2: 8-Acetyl-3-n-dodecyl-7,7,9,9-tetramethyl-1,3,8-triazaspiro[4,5]decane-2,4-dione (melting point: ordinary temperature or higher; trade name: SANOL LS-440, manufactured by SANKYO CO., LTD.);

HALS 3; 1,2,2,6, 6-Pentamethyl-4-piperidyl methacrylate (melting point: −5° C. or lower, radical polymerizable, trade name: ADK STAB LA-82, manufactured by Asahi Denka Kogyo K.K.); and HALS 4: An aqueous dispersion of 1,2,2,6,6-pentamethyl-4-piperidyl/n-tridecyl 1,2,3,4-butanetetracarboxylate (melting point: −5° C. or lower, trade name: ADK STAB LX-332, manufactured by Asahi Denka Kogyo K.K.).

Details of (*1) to (*5) shown in Table 1 are as follows:

(*1): The trade name of a partial hydrolysate/partial condensation product of methyltrimethoxysilane (manufactured by SHIN-ETSU CHEMICAL CO., LTD.

(*2): Acrylic acid and methacrylic acid are also component (D)

(*3): Trade name (manufactured by KAO CORPORATION)

(*4): Trade name (manufactured by KAO CORPORATION)

(*5): Trade name (manufactured by KAO CORPORATION)

As shown in Table 1, in Comparative Example 2 in which the particle size reduction of the emulsion was not carried out, polymerization stability and storage stability were low, and an aggregate in which, deducing from its hue, component (F) was contained at a high concentration was developed in large amounts. Further, in Comparative Example (3) in which the particle size reduction of the emulsion was not carried out, and component (A) was added after the polymerization of component (B) had proceeded to allow component (A) to be hydrolyzed/condensed, storage stability was insufficient.

EXAMPLES 8 to 14 AND COMPARATIVE EXAMPLES 4 to 6

To each of the aqueous dispersions obtained in Examples 1 to 7 and Comparative Examples 1 to 3, 2 parts (solid content) of an aqueous dispersion of di-n-butyltin dilaurate as a hardening accelerator and 5 parts (solid content) of an aqueous emulsion of an oxiazoline crosslinking agent, K2020 (trade name, manufactured by Nippon Shokubai Kagaku Kogyo Co., Ltd.) were added. Equivalent adipic acid dihydrazide was added to each of the aqueous dispersions using diacetoneacrylamide as component (B). Further, 10 parts of butyl cellosolve was added as a film forming assistant. Thus, each coating material (clear) was prepared.

Each of the following enamel coatings (1) to (3) was applied to each base material shown in Table 2 in an amount of 50 g/m² on a dry weight basis and dried. Then, each coating material described above was applied thereto in an amount of 20 g/m² on a dry weight basis, and heated at 120° C. for 10 minutes to prepare each test piece.

Results of the evaluations for each test piece are shown in Table 2.

TABLE 2

| | Example | | | | | | | Comparative Example | | |
|---|---|---|---|---|---|---|---|---|---|---|
| | 8 | 9 | 10 | 11 | 12 | 13 | 14 | 4 | 5 | 6 |
| | Aqueous dispersion (No. of Example or Comparative Example) | | | | | | | | | |
| | 1 | 2 | 3 | 4 | 5 | 6 | 7 | 1 | 2 | 3 |
| Evaluation item (Base material/enamel coating) Adhesion: | | | | | | | | | | |
| SUS 304/(1) | 100 | 100 | 100 | 100 | 100 | 100 | 100 | 100 | 80 | 100 |
| SUS 304/(2) | 100 | 100 | 100 | 100 | 100 | 100 | 100 | 100 | 80 | 100 |
| SUS 304/(3) | 100 | 100 | 100 | 100 | 100 | 100 | 100 | 100 | 80 | 100 |
| Flexible plate (*1)/(1) | 100 | 100 | 100 | 100 | 100 | 100 | 100 | 100 | 80 | 100 |
| Flexible plate (*1)/(2) | 100 | 100 | 100 | 100 | 100 | 100 | 100 | 100 | 80 | 100 |
| Flexible plate (*1)/(3) | 100 | 100 | 100 | 100 | 100 | 100 | 100 | 100 | 80 | 100 |
| Hardness: | | | | | | | | | | |
| SUS 304/(1) | H | H | 2H | H | 2H | H | H | H | B | HB |
| Water resistance: | | | | | | | | | | |
| SUS 304/(1) | ○ | ○ | ○ | ○ | ○ | ○ | ○ | ○ | X | ○ |
| Organic chemical resistance: | | | | | | | | | | |
| SUS 304/(1) | ○ | ○ | ○ | ○ | ○ | ○ | ○ | ○ | X | X |
| Stain resistance: | | | | | | | | | | |
| Flexible plate (*1)/(1) | ○ | ○ | ○ | ○ | ○ | ○ | ○ | ○ | Δ | Δ |
| Evaluation item (Base material/enamel coating) Weather resistance (1): | | | | | | | | | | |
| SUS 304/(1) | ○ | ○ | ⊙ | ⊙ | ○ | ⊙ | ○ | Δ | X | Δ |
| SUS 304/(2) | ○ | ○ | ⊙ | ⊙ | ○ | ⊙ | ○ | Δ | X | Δ |
| SUS 304/(3) | ○ | ○ | ⊙ | ⊙ | ○ | ⊙ | ○ | Δ | X | Δ |
| Flexible plate (*1)/(1) | ○ | ○ | ⊙ | ⊙ | ○ | ⊙ | ○ | Δ | X | Δ |
| Flexible plate (*1)/(2) | ○ | ○ | ⊙ | ⊙ | ○ | ⊙ | ○ | Δ | X | Δ |
| Flexible plate (*1)/(3) | ○ | ○ | ⊙ | ⊙ | ○ | ⊙ | ○ | Δ | X | Δ |
| Frost resistance: | | | | | | | | | | |
| Flexible plate (*1)/(1) | ⊙ | ⊙ | ○ | ⊙ | ⊙ | ⊙ | ⊙ | ○ | X | ⊙ |
| Flexible plate (*1)/(2) | ⊙ | ⊙ | ○ | ⊙ | ⊙ | ⊙ | ⊙ | ○ | X | ⊙ |
| Flexible plate (*1)/(3) | ⊙ | ⊙ | ○ | ⊙ | ⊙ | ⊙ | ⊙ | ○ | X | ⊙ |
| Weather resistance (2): | | | | | | | | | | |
| Hard aluminum plate/(4) | ○ | ○ | ○ | ○ | ○ | ○ | ○ | X | X | ○ |
| Leveling property: | | | | | | | | | | |
| Hard aluminum plate/(4) | ○ | ○ | ○ | ○ | ○ | ○ | ○ | ○ | ○ | ○ |
| Anti-checking property: | | | | | | | | | | |
| Glass plate | ○ | ○ | ○ | ○ | ○ | ○ | ○ | ○ | X | ○ |

(*1): Defined in JIS A5403 (asbestos slate).

Enamel coatings (1) to (3) were each prepared by adding 55 parts of titanium oxide (white), 28.7 parts of calcium carbonate, 7 parts of clay, 7 parts of red iron oxide and 27.7 parts of hydroxyethyl cellulose (HEC) thickener to 100 parts of an acrylic emulsion (AE379A, manufactured by JSR CORPORATION) for enamel coating (1), a silicone acrylic emulsion (AE8136, manufactured by JSR CORPORATION) for enamel coating (2), and an acrylic urethane emulsion (VONCOATCG-5010, manufactured by Dainippon Ink & Chemicals Inc.) for enamel coating (3), respectively, and mixing them by a sand mill. Enamel coating (4) is white enamel (PWC=40%) using a silicone acrylic emulsion (B7302, manufactured by JSR CORPORATION) as varnish.

EXAMPLES 15 to 21 AND COMPARATIVE EXAMPLES 7 to 9

Using each of the aqueous dispersions obtained in Examples 1 to 7 and Comparative Example 1 to 3, a mixture of the compounding formulation shown in Table 3 was mixed by a sand mill. Then, 2 parts (solid content) of an aqueous dispersion of dibutyltin dilaurate as a hardening accelerator and 5 parts (solid content) of an aqueous emulsion of an oxiazoline crosslinking agent, K2020 (trade name, manufactured by Nippon Shokubai Kagaku Kogyo Co., Ltd.) were added. Equivalent adipic acid dihydrazide was added to each of the aqueous dispersions using diacetone-acrylamide as component (B). Further, 10 parts of butyl cellosolve was added as a film forming assistant. Thus, each coating material (clear) was prepared.

Each of the above-mentioned enamel coatings (1) to (3) was applied to each base material shown in Table 3 in an amount of 50 g/m² on a dry weight basis and dried. Then, each coating material described above was applied thereto in an amount of 20 g/m² on a dry weight basis, and heated at 120° C. for 10 minutes to prepare each test piece.

Results of the evaluations for each test piece are shown in Table 3.

TABLE 3

| | Example | | | | | | | Comparative Example | | |
|---|---|---|---|---|---|---|---|---|---|---|
| | 15 | 16 | 17 | 18 | 19 | 20 | 21 | 7 | 8 | 9 |
| | Aqueous dispersion (No. of Example or Comparative Example) | | | | | | | | | |
| | 1 | 2 | 3 | 4 | 5 | 6 | 7 | 1 | 2 | 3 |
| Compounding formulation (parts) | | | | | | | | | | |
| Aqueous dispersion | 100 | 100 | 100 | 100 | 100 | 100 | 100 | 100 | 100 | 100 |
| Titanium oxide (white) | 26 | 26 | 26 | 26 | 26 | 26 | 26 | 26 | 26 | 26 |
| HEC thickener | 0.5 | 0.5 | 0.5 | 0.5 | 0.5 | 0.5 | 0.5 | 0.5 | 0.5 | 0.5 |
| Evaluation item (Base material/enamel coating) Adhesion: | | | | | | | | | | |
| SUS 304/(1) | 100 | 100 | 100 | 100 | 100 | 100 | 100 | 100 | 80 | 100 |
| SUS 304/(2) | 100 | 100 | 100 | 100 | 100 | 100 | 100 | 100 | 80 | 100 |
| SUS 304/(3) | 100 | 100 | 100 | 100 | 100 | 100 | 100 | 100 | 80 | 100 |
| Flexible plate (*1)/(1) | 100 | 100 | 100 | 100 | 100 | 100 | 100 | 100 | 80 | 100 |
| Flexible plate (*1)/(2) | 100 | 100 | 100 | 100 | 100 | 100 | 100 | 100 | 80 | 100 |
| Flexible plate (*1)/(3) | 100 | 100 | 100 | 100 | 100 | 100 | 100 | 100 | 80 | 100 |
| Hardness: | | | | | | | | | | |
| SUS 304/(1) | 2H | 2H | 2H | 2H | 2H | 2H | 2H | 2H | F | H |
| Water resistance: | | | | | | | | | | |
| SUS 304/(1) | ◯ | ◯ | ◯ | ◯ | ◯ | ◯ | ◯ | ◯ | X | ◯ |
| Organic chemical resistance: | | | | | | | | | | |
| SUS 304/(1) | ◯ | ◯ | ◯ | ◯ | ◯ | ◯ | ◯ | ◯ | X | X |
| Evaluation item (Base material/enamel coating) Stain resistance: | | | | | | | | | | |
| Flexible plate (*1)/(1) | ◯ | ◯ | ◯ | ◯ | ◯ | ◯ | ◯ | ◯ | Δ | Δ |
| Weather resistance (1): | | | | | | | | | | |
| SUS 304/(1) | ◯ | ◯ | ⊚ | ⊚ | ◯ | ⊚ | ◯ | Δ | X | Δ |
| SUS 304/(2) | ◯ | ◯ | ⊚ | ⊚ | ◯ | ⊚ | ◯ | Δ | X | Δ |
| SUS 304/(3) | ◯ | ◯ | ⊚ | ⊚ | ◯ | ⊚ | ◯ | Δ | X | Δ |
| Flexible plate (*1)/(1) | ◯ | ◯ | ⊚ | ⊚ | ◯ | ⊚ | ◯ | Δ | X | Δ |
| Flexible plate (*1)/(2) | ◯ | ◯ | ⊚ | ⊚ | ◯ | ⊚ | ◯ | Δ | X | Δ |
| Flexible plate (*1)/(3) | ◯ | ◯ | ⊚ | ⊚ | ◯ | ⊚ | ◯ | Δ | X | Δ |
| Frost resistance: | | | | | | | | | | |
| Flexible plate (*1)/(1) | ⊚ | ⊚ | ◯ | ⊚ | ⊚ | ⊚ | ⊚ | ◯ | X | ⊚ |
| Flexible plate (*1)/(2) | ⊚ | ⊚ | ◯ | ⊚ | ⊚ | ⊚ | ⊚ | ◯ | X | ⊚ |
| Flexible plate (*1)/(3) | ⊚ | ⊚ | ◯ | ⊚ | ⊚ | ⊚ | ⊚ | ◯ | X | ⊚ |
| Leveling property: | | | | | | | | | | |
| Hard aluminum plate/(4) | ◯ | ◯ | ◯ | ◯ | ◯ | ◯ | ◯ | ◯ | ◯ | ◯ |
| Anti-checking property: | | | | | | | | | | |
| Glass plate | ◯ | ◯ | ◯ | ◯ | ◯ | ◯ | ◯ | ◯ | ◯ | ◯ |

EXAMPLE 22

(Example of Showing Alcohol Concentration within the Range Specified in the Invention Just after Polymerization without Any Adjustment)

Components (A) and (B) shown in Table 4, 0.6 part of sodium dodecylbenzenesulfonate and 100 parts of water were stirred at room temperature for 10 minutes to obtain an emulsion, and an 80% aqueous solution of acrylic acid was added thereto. Hydrolysis/condensation reaction was conducted at 40° C. for 2 hours with stirring, and then, emulsification was carried out with a high pressure homogenizer (Microfluidizer M-110Y, manufactured by Mizuho Industrial Co., Ltd.) at a pressure of 70 MPa.

Aside from the above-mentioned emulsion, 40 parts of water and 3 parts of a 25% aqueous solution of Aqualon KH-10 were poured into a four neck separable flask, and nitrogen replacement and heating were carried out with stirring. When a temperature of 75° C. was reached, a radical initiator (an aqueous solution of potassium persulfate) was added, and subsequently, the above-mentioned emulsion was added dropwise for 2 hours while maintaining the temperature at 75° C. The polymerization was completed after further heating at 80° C. for 2 hours. After the polymerization, the pH of the system was adjusted to 6.5 with a 10% aqueous solution of ammonia to obtain aqueous polymer dispersion (22).

EXAMPLES 23 AND 24

Examples of Adjusting Alcohol Concentration within the Range Specified in the Invention by Concentration after Polymerization Respective components shown in Table 4 were stirred at room temperature for 10 minutes to obtain an emulsion, and an 80% aqueous solution of acrylic acid was added thereto. Hydrolysis/condensation reaction was conducted at 40° C. for 2 hours with stirring, and then, emulsification was carried out with a high pressure homogenizer (Microfluidizer M-110Y, manufactured by Mizuho Industrial Co., Ltd.) at a pressure of 70 MPa. This emulsion was poured into a four neck separable flask, and after nitrogen replacement, a radical initiator (an aqueous solution of potassium persulfate) was added with stirring, followed by polymerization at 75° C. for 4 hours. After the polymerization, the pH of the system was adjusted to 6.5 with a 10% aqueous solution of ammonia. One opening of the four neck separable flask was released, and nitrogen gas was blown therein through another opening at a rate of 50 liters/minute. The temperature was elevated again to 80° C. with stirring to remove alcohols by distillation for 8 hours. The solid concentration of both aqueous dispersions obtained exceeded 40%, so that the solid concentration was adjusted to 38% by adding water thereto, thereby obtaining aqueous polymer dispersions (23) and (24).

EXAMPLE 25

Example of Adjusting Alcohol Concentration within the Range Specified in the Invention by Addition of Alcohol Polymerization was conducted to prepare an aqueous polymer dispersion in the same manner as with Example 1 as shown in Table 1 with the exception that a completely hydrolyzed partial condensation product of alkoxysilanes, that is to say, SH6018 having no hydrolytic alkoxyl group, was used as component (A), and 1 part of methanol was added to obtain aqueous polymer dispersion (25).

Adipic acid dihydrazide (solid) was added to each of the aqueous polymer dispersions (22) to (25) obtained in Examples 22 to 25 in an amount as shown in Table 4, based on 100 parts of the aqueous polymer dispersion, and a 10% aqueous dispersion of dibutyltin dilaurate was added as shown in Table 4 as needed, followed by mixing to prepare each coating agent (clear).

Results of the evaluations for each test piece are shown in Table 4.

TABLE 4

| Example | | 22 | 23 | 24 | 25 |
|---|---|---|---|---|---|
| Compounding Formulation (parts) | | | | | |
| Component (A) | Dimethyldimethoxysilane | 0 | 13 | 24 | 0 |
| | X40-9220 | 14.9 | 18 | 36 | 0 |
| | SH6018 | 0 | 0 | 0 | 10 |
| Component (B) | Methyl methacrylate | 39.5 | 45 | 14 | 39.5 |
| | n-Butyl acrylate | 0 | 14.2 | 0 | 0 |
| | Cyclohexyl methacrylate | 20 | 0 | 8 | 20 |
| | 2-Ethylhexyl acrylate | 23 | 10 | 10 | 23 |
| | 2-Hydroxyethyl methacrylate | 2.4 | 2.4 | 2.4 | 2.4 |
| | Diacetoneacrylamide | 2 | 4 | 4 | 2 |
| | 3-trimethoxysilylpropyl methacrylate | 0.7 | 0.7 | 0.8 | 0.7 |
| | Dimethylacrylamide | 0.5 | 1 | 0 | 0.5 |
| | PE-200 | 1 | 1 | 0 | 1 |
| | Glycidyl methacrylate | 0 | 1 | 0 | 0 |
| Component (C) | Sodium dodecylbenzenesulfonate | 0.6 | 0.6 | 0.6 | 0.6 |
| | Aqualon KH-10 (25%) | 3 | 1.5 | 0 | 3 |
| | Emargen 147 | 0 | 1.5 | 1.5 | 0 |
| | LEVENOL WX | 0 | 0 | 1.5 | 0 |
| Component (F) | TINUVIN-123 | 1 | 2 | 2 | 1 |
| | LA-82 | 0.5 | 0 | 0 | 0.5 |
| Aqueous medium | Water | 140 | 220 | 200 | 140 |
| Acidic component | Acrylic acid (80%) | 2 | 2 | 2 | 2 |
| Component (E) | Potassium persulfate (3.5%) | 11 | 11 | 6 | 11 |
| Additive | Adipic acid dihydrazide | 1 | 1.5 | 2 | 1 |
| | Dibutyltin dilaurate (10% aqueous dispersion) | 0 | 0 | 10 | 0 |
| Results of Evaluations | Methanol concentration | 1.8% | 0.6% | 1.4% | 1.0% |
| | Weather resistance (2) | ○ | ○ | ○ | Δ |
| | Leveling property | ○ | ○ | ○ | ○ |
| | Anti-checking property | ○ | ○ | ○ | ○ |

Details of various additives shown in Tables 4 and 5 are as follows:

X40-9220: A hydrolyzed condensation product of 10 to 15 molecules of methyltrimethoxysilane, manufactured by SHIN-ETSU CHEMICAL CO., LTD.;

SH6018: A completely hydrolyzed partial condensation product of methyltrimethoxysilane and phenyltrimethoxysilane, manufactured by Dow Corning Toray Silicone Co., Ltd.;

PE-200: BLEMER PE-200 manufactured by NOF CORPORATION, polyoxyethylene methacrylate;

Aqualon KH-10: A reactive emulsifier having a polyoxyethylene chain whose terminal is esterified with sulfuric acid, manufactured by Dai-ichi Kogyo Seiyaku Co., Ltd.;

Emargen 147: Polyoxyethylene alkyl ether, manufactured by KAO CORPORATION.;

LEVENOL WX: Sodium poly(oxyethylene alkyl ether) sulfate, manufactured by KAO CORPORATION.;

TINUVIN-123: A hindered amine-based light stabilizing agent, manufactured by Ciba Specialty Chemicals K. K.;

LA-82: A reactive hindered amine-based light stabilizing agent, manufactured by Asahi Denka Kogyo K.K.

COMPARATIVE EXAMPLE 10

Example in Which the Alcohol Concentration Exceeds 2%

Polymerization was conducted in the same manner as with Example 24, and then, the pH of the system was adjusted to 6.5 with a 10% aqueous solution of ammonia. The resulting aqueous dispersion was used as such without removing alcohols by distillation to obtain aqueous polymer dispersion (10) for comparison.

COMPARATIVE EXAMPLE 11

(Example in Which the Alcohol Concentration is Less than 0.1%)

Polymerization was conducted in the same manner as with Example 22 to prepare an aqueous dispersion. The resulting aqueous dispersion was used as such without adding any alcohol obtain aqueous polymer dispersion (11) for comparison.

Adipic acid dihydrazide (solid) was added to each of the aqueous polymer dispersions (10) and (11) obtained in Comparative Examples 10 and 11 in an amount as shown in Table 5, based on 100 parts of the aqueous polymer dispersion, and a 10% aqueous dispersion of dibutyltin dilaurate was added as shown in Table 5 as needed, followed by mixing to prepare each coating agent (clear).

Results of the evaluations for each test piece are shown in Table 5.

TABLE 5

| Comparative Example | | 10 | 11 |
|---|---|---|---|
| Compounding Formulation (parts) | | | |
| Component (A) | Dimethyldimethoxysilane | 24 | 0 |
| | X40-9220 | 36 | 0 |
| | SH6018 | 0 | 10 |
| Component (B) | Methyl methacrylate | 14 | 39.5 |
| | n-Butyl acrylate | 0 | 0 |
| | Cyclohexyl methacrylate | 8 | 20 |
| | 2-Ethylhexyl acrylate | 10 | 23 |
| | 2-Hydroxyethyl methacrylate | 2.4 | 2.4 |
| | Diacetoneacrylamide | 4 | 2 |
| | 3-trimethoxysilylpropyl methacrylate | 0.8 | 0.7 |
| | Dimethylacrylamide | 0 | 0.5 |
| | PE-200 | 0 | 1 |
| | Glycidyl methacrylate | 0 | 0 |
| Component (C) | Sodium dodecylbenzene-sulfonate | 0.6 | 0.6 |
| | Aqualon KH-10 | 0 | 3 |
| | Emargen 147 | 1.5 | 0 |
| | LEVENOL WX | 1.5 | 0 |
| Component (F) | TINUVIN-123 | 2 | 1 |
| | LA-82 | 0 | 0.5 |
| Aqueous medium | Water | 200 | 140 |
| Acidic component | Acrylic acid (80%) | 2 | 2 |
| Component (E) | Potassium persulfate (3.5%) | 6 | 11 |
| Additive | Adipic acid dihydrazide | 2 | 1 |
| | Dibutyltin dilaurate (10% aqueous dispersion) | 10 | 0 |
| Results of | Methanol concentration (%) | 9.8 | 0.0 |

TABLE 5-continued

| Comparative Example | | 10 | 11 |
|---|---|---|---|
| Evaluations | Weather resistance (2) | ○ | Δ |
| | Leveling property | ○ | X |
| | Anti-checking property | X | ○ |

What is claimed is:

1. An aqueous dispersion obtained by:
   mixing an emulsifying
   (A) at least one component selected from the group consisting of an organosilane represented by the following general formula (1), a hydrolysate of the organosilane, and a partial condensation product of the hydrolysate,
   (B) a radical polymerizable monomer,
   (C) an emulsifier,
   (D) a hydrolytic catalyst for component (A), and
   (F) a liquid component having a melting point of −50° C. or less, having no radical polymerizable properties, and having ultraviolet absorption action, light stabilization action, or both ultraviolet absorption action and light stabilization action,
   to form an emulsified mixture, to reduce the particle size of said emulsion, and to allow hydrolysis of component (A) to proceed; and
   then adding
   (E) a radical polymerizable initiator to allow polymerization of component (B) to proceed;
   wherein said aqueous dispersion has a concentration of one or more alcohols having a boiling point of 100° C. or less of 0.1% to 2.0% by weight:

$$(R^1)_{4-n}-(Si)-(OR^2)_n \qquad (1)$$

wherein $R^1$ indicates a monovalent organic group having 1 to 8 carbon atoms, wherein when two $R^1$'s exist, they may be the same or different; $R^2$ indicates a straight-chain or branched alkyl group having 1 to 5 carbon atoms or an acyl group having 1 to 6 carbon atoms, wherein when two $R^2$'s exist, they may be the same or different; and n is an integer of from 2 to 4.

2. The aqueous dispersion according to claim 1, wherein component (B) contains a radical polymerizable monomer having a group which can form a siloxane bond.

3. The aqueous dispersion according to claim 1, wherein component (F) contains at least one selected from the group consisting of a triazine-based ultraviolet absorbing agent, a benzotriazole-based ultraviolet absorbing agent, a cyanoacrylate-based organic ultraviolet absorbing agent, and a hindered amine-based light stabilizing agent.

4. The aqueous dispersion according to claim 1, which is obtained by: mixing and emulsifying components (A), (B), (C), (D) and (F), to form an emulsified mixture, to reduce the particle size of said emulsion, and to allow hydrolysis of component (A) to proceed; adding component (B) to allow polymerization of component (B) to proceed; and then further comprising removing one or more alcohols having a boiling point of 100° C. or less by distillation.

5. The aqueous dispersion according to claim 1, which is obtained by mixing and emulsifying components (A), (B), (C), (D), and (F), to form an emulsified mixture, to reduce the particle size of said emulsion, and to allow hydrolysis of component (A) to proceed, wherein component (B) has an average particle size of 0.5 μm or less in said emulsified mixture; adding component (B) to allow polymerization of component (B) to proceed; and then further comprising removing one or more alcohols having a boiling point of 100° C. or less by distillation.

6. A coated product obtained by coating the aqueous dispersion according to claim 1 to a base material.

7. The aqueous dispersion according to claim 1, wherein component (B) has an average particle size of 0.5 µm or less in said emulsified mixture.

8. The aqueous dispersion according to claim 1, wherein component (B) has an average particle size of 0.3 µm or less in said emulsified mixture.

9. The aqueous dispersion according to claim 1, wherein component (B) has an average particle size of 0.03 to 0.2 µm in said emulsified mixture.

10. The aqueous dispersion according to claim 1, wherein mixing is carried out by stirring.

11. The aqueous dispersion according to claim 1, wherein the particle size of the emulsion is reduced with a homogenizer, a homomixer or an ultrasonic dispersing device.

12. The aqueous dispersion according to claim 1, wherein the hydrolyzed component (A) and the polymer of component (B) form a composite polymer particle having an interpenetrating polymer network.

13. The aqueous dispersion according to claim 12, wherein said composite polymer particle has an average particle size of from 0.05 to 0.3 µm.

14. The aqueous dispersion according to claim 1, having a concentration of an alcohol or alcohols having a boiling point of 100° C. or less of 0.2% to 2.0% by weight.

15. The aqueous dispersion according to claim 1, having a concentration of an alcohol or alcohols having a boiling point of 100° C. or less of 0.5% to 2.0% by weight.

* * * * *